US011148064B2

(12) United States Patent
Kasuga

(10) Patent No.: US 11,148,064 B2
(45) Date of Patent: Oct. 19, 2021

(54) FIGURE, DRIVE UNIT, POWER MECHANISM, AND FIGURE SYSTEM

(71) Applicant: Speecys Corp., Mitaka (JP)

(72) Inventor: Tomoaki Kasuga, Mitaka (JP)

(73) Assignee: SPEECYS CORP., Tokyo (JP)

( * ) Notice: Subject to any disclaimer, the term of this patent is extended or adjusted under 35 U.S.C. 154(b) by 0 days.

(21) Appl. No.: 16/463,687

(22) PCT Filed: Nov. 22, 2017

(86) PCT No.: PCT/JP2017/041946
§ 371 (c)(1),
(2) Date: May 23, 2019

(87) PCT Pub. No.: WO2018/097163
PCT Pub. Date: May 31, 2018

(65) Prior Publication Data
US 2019/0321739 A1    Oct. 24, 2019

(30) Foreign Application Priority Data

Nov. 24, 2016    (JP) .............................. JP2016-228037

(51) Int. Cl.
*A63H 13/04*    (2006.01)
*A63H 3/46*    (2006.01)
(Continued)

(52) U.S. Cl.
CPC .............. *A63H 13/04* (2013.01); *A63H 3/46* (2013.01); *A63H 29/22* (2013.01); *A63H 31/10* (2013.01);
(Continued)

(58) Field of Classification Search
USPC ........ 446/268, 330, 352, 354, 358, 359, 376
See application file for complete search history.

(56) References Cited

U.S. PATENT DOCUMENTS 5,013,276 A * 5/1991 Garfinkel ............... A63H 13/00
446/14
5,413,517 A * 5/1995 Kamijima .............. A63H 13/12
40/411

(Continued)

FOREIGN PATENT DOCUMENTS

CN    106163626 A    11/2016
JP    H3-213288 A    9/1991
(Continued)

OTHER PUBLICATIONS

Int'l Search Report dated Feb. 27, 2018 in Int'l Application No. PCT/JP2017/041946.

*Primary Examiner* — Nini F Legesse
(74) *Attorney, Agent, or Firm* — Panitch Schwarze Belisario & Nadel LLP

(57) ABSTRACT

The figure system includes: a plurality of drive units each including an actuator that generates rotative force; and a figure including a plurality of movable mechanisms and a plurality of flexible wires. The movable mechanisms each include a movable body that operates by the rotative force and an operation amount detector that detects an amount of operation of the movable body. The flexible wires include their respective first ends that are coupled to the movable (Continued)

bodies. The rotative force generated by one of the actuators is transmitted to corresponding one of the movable bodies through one of the flexible wires.

19 Claims, 17 Drawing Sheets

(51) Int. Cl.
*A63H 29/22* (2006.01)
*A63H 31/10* (2006.01)
*B25J 9/10* (2006.01)
*B25J 19/00* (2006.01)
*F16C 1/06* (2006.01)
*F16C 1/18* (2006.01)
*B25J 9/00* (2006.01)
*F16H 1/46* (2006.01)
*G09B 7/00* (2006.01)

(52) U.S. Cl.
CPC ........... *B25J 9/102* (2013.01); *B25J 19/0029* (2013.01); *F16C 1/06* (2013.01); *F16C 1/18* (2013.01); *A63H 2200/00* (2013.01); *B25J 9/0003* (2013.01); *F16H 1/46* (2013.01); *G09B 7/00* (2013.01)

(56) References Cited

U.S. PATENT DOCUMENTS

| | | | | |
|---|---|---|---|---|
| 6,126,508 A | * | 10/2000 | Chou | A63H 3/20 |
| | | | | 446/352 |
| 6,482,068 B2 | * | 11/2002 | Lee | A63H 3/46 |
| | | | | 446/376 |
| 7,104,865 B1 | * | 9/2006 | Neuburger | A63F 9/06 |
| | | | | 446/330 |
| 7,318,766 B2 | * | 1/2008 | Marine | A63H 13/04 |
| | | | | 446/268 |
| 10,621,896 B2 | * | 4/2020 | Kasuga | A63H 3/20 |
| 2007/0099537 A1 | | 5/2007 | Sandoval et al. | |
| 2008/0026669 A1 | * | 1/2008 | Rehkemper | A63H 13/00 |
| | | | | 446/301 |
| 2009/0215358 A1 | | 8/2009 | Moothedath et al. | |
| 2009/0272585 A1 | | 11/2009 | Nagasaka | |
| 2010/0259057 A1 | | 10/2010 | Madhani | |
| 2017/0162088 A1 | | 6/2017 | Kasuga | |

FOREIGN PATENT DOCUMENTS

| | | |
|---|---|---|
| JP | 2002-200365 A | 7/2002 |
| JP | 2002-346960 A | 12/2002 |
| JP | 2009-213671 A | 9/2009 |
| JP | 2009-269102 A | 11/2009 |
| JP | 2010-240834 A | 10/2010 |
| JP | 5303743 B2 | 10/2013 |
| WO | 2015/146301 A1 | 10/2015 |

* cited by examiner

[FIG.1]
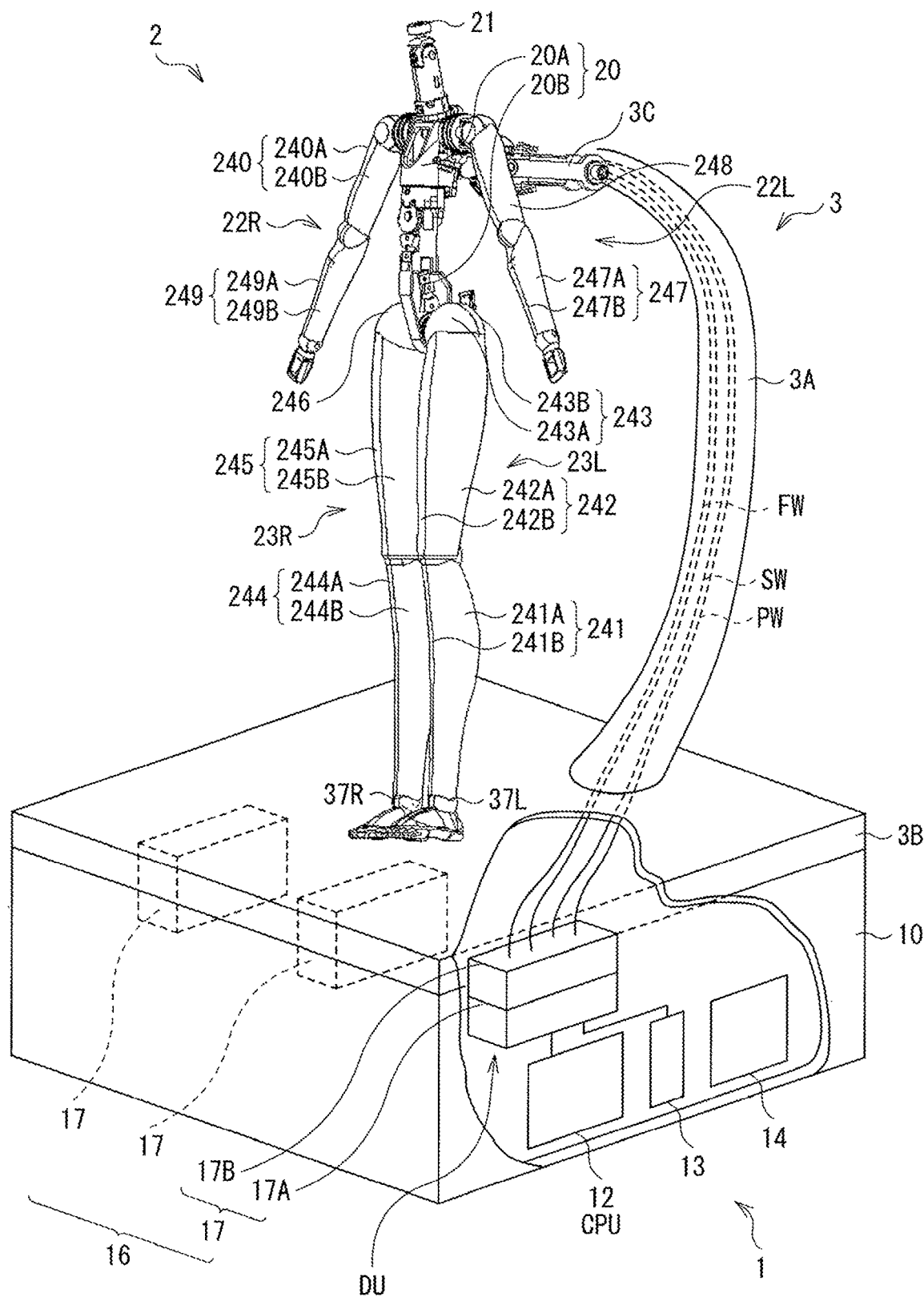

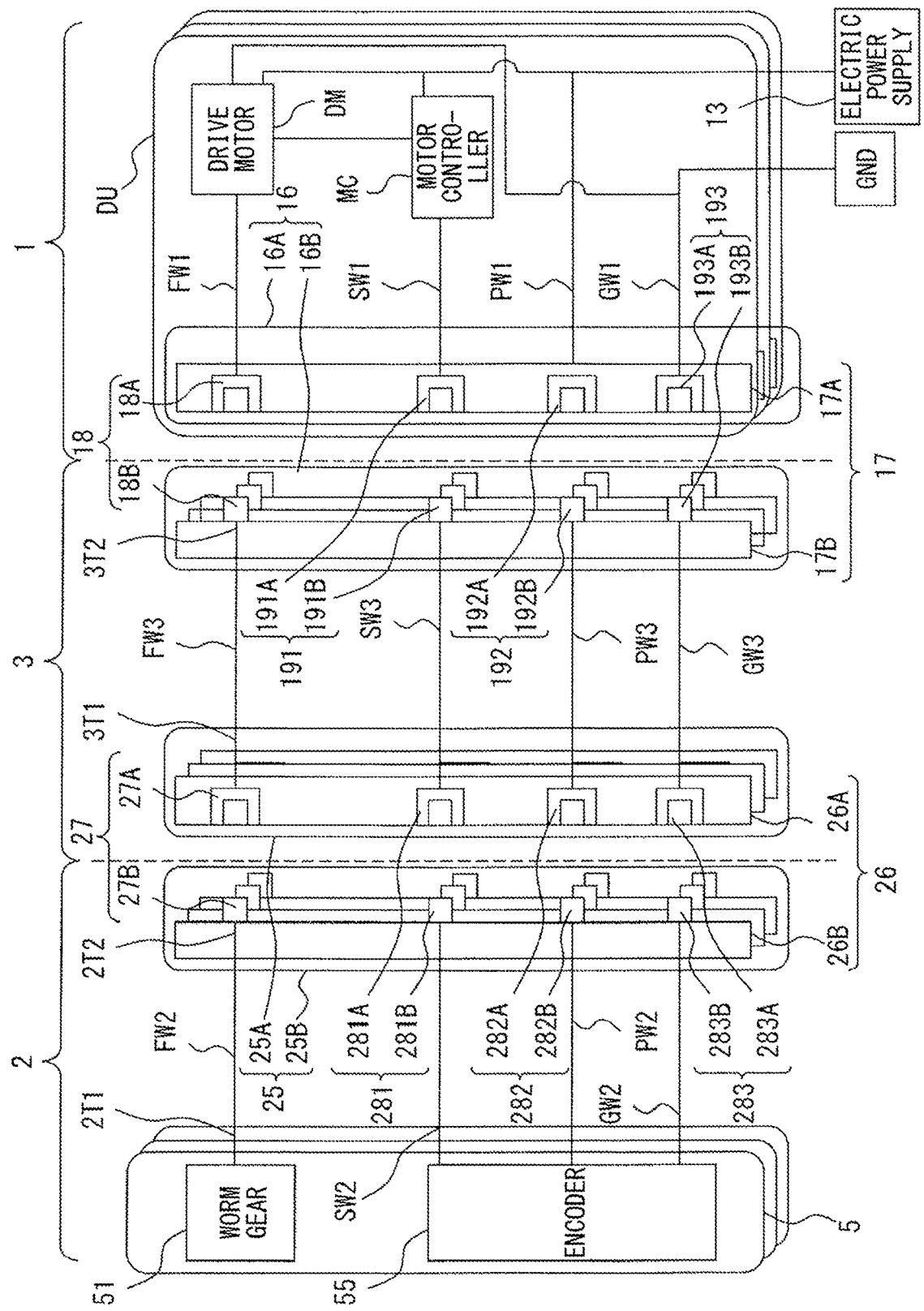
[FIG. 2A]

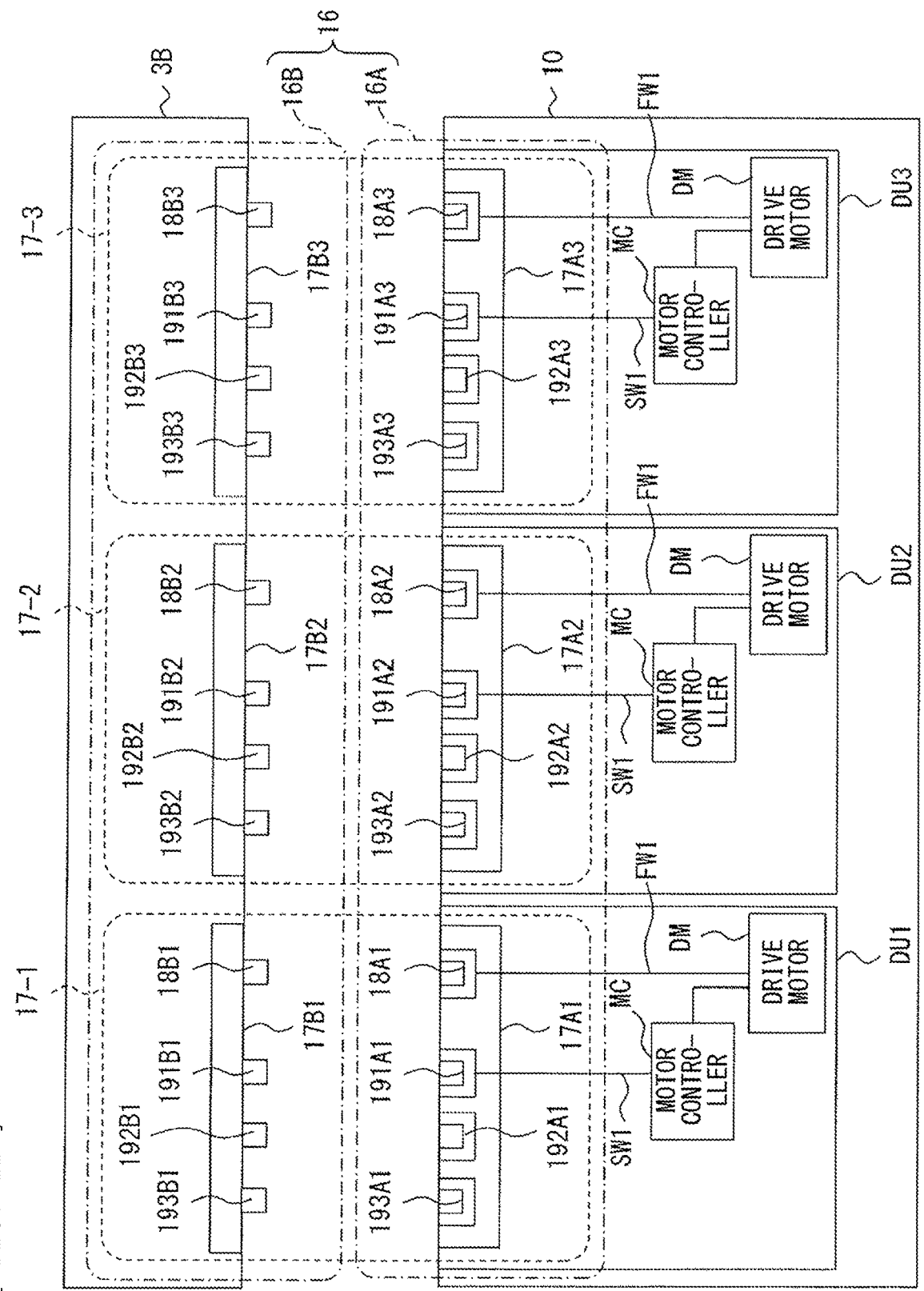

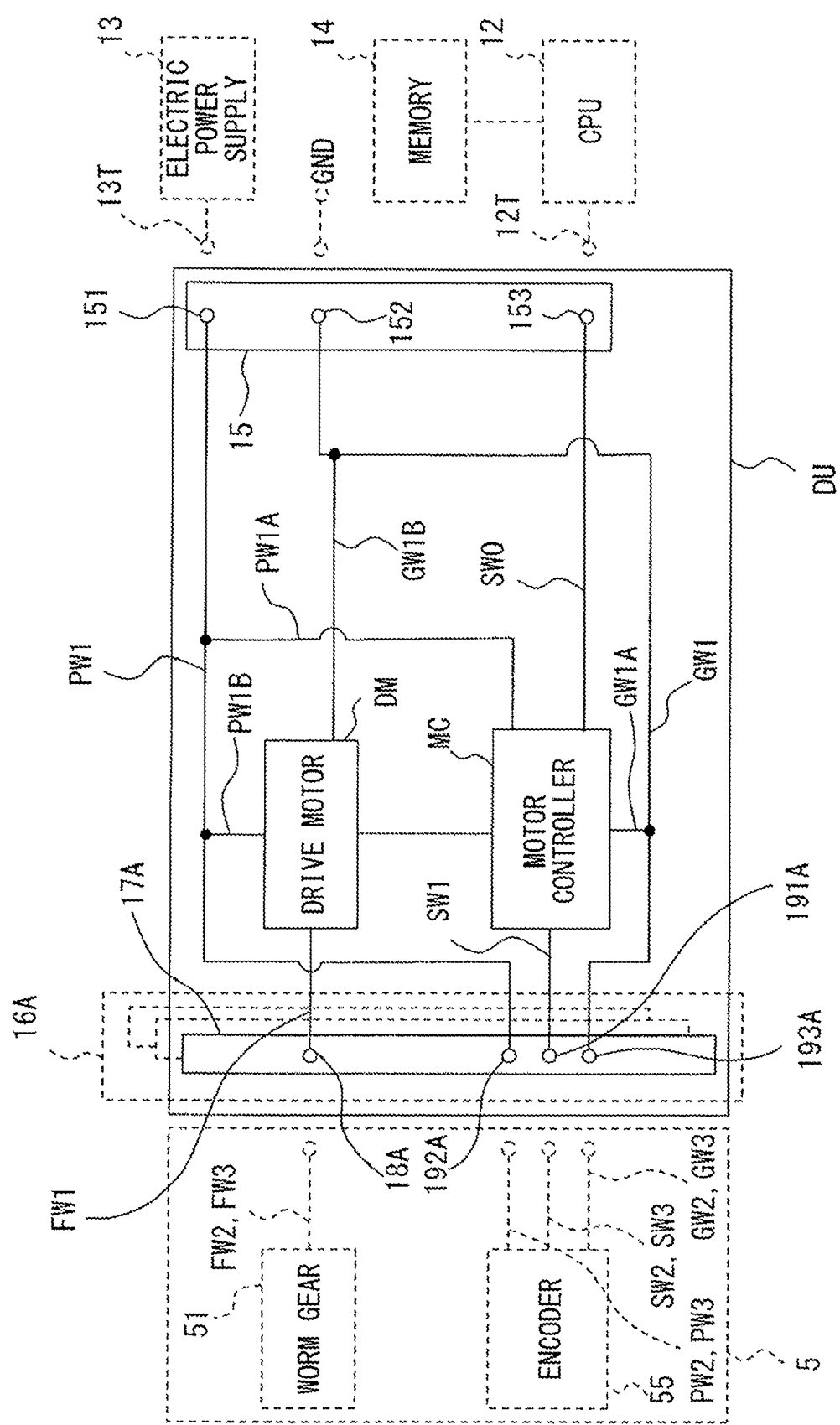
[ FIG. 3 ]

[ FIG. 4A ]
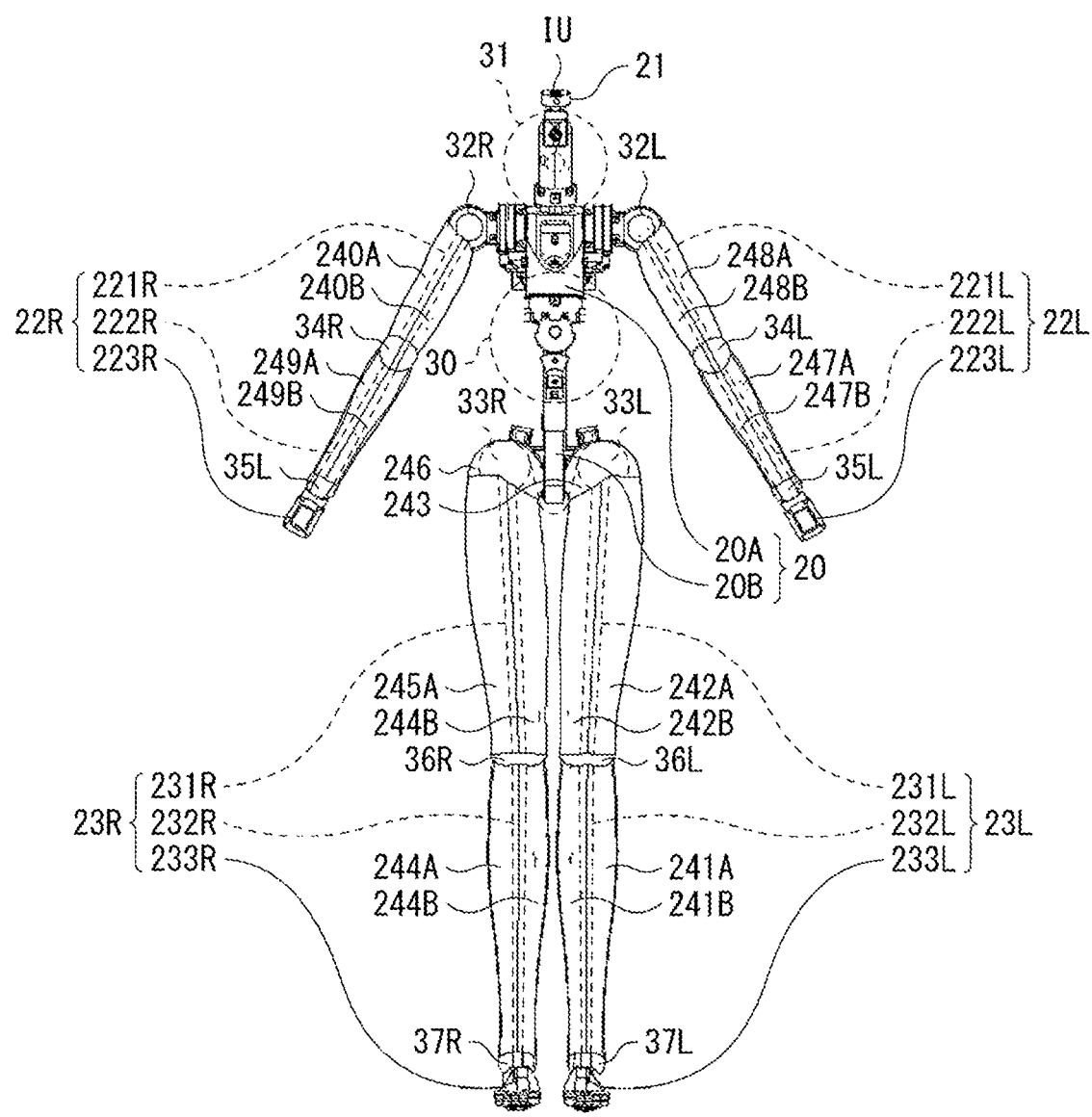

[ FIG. 4B ]
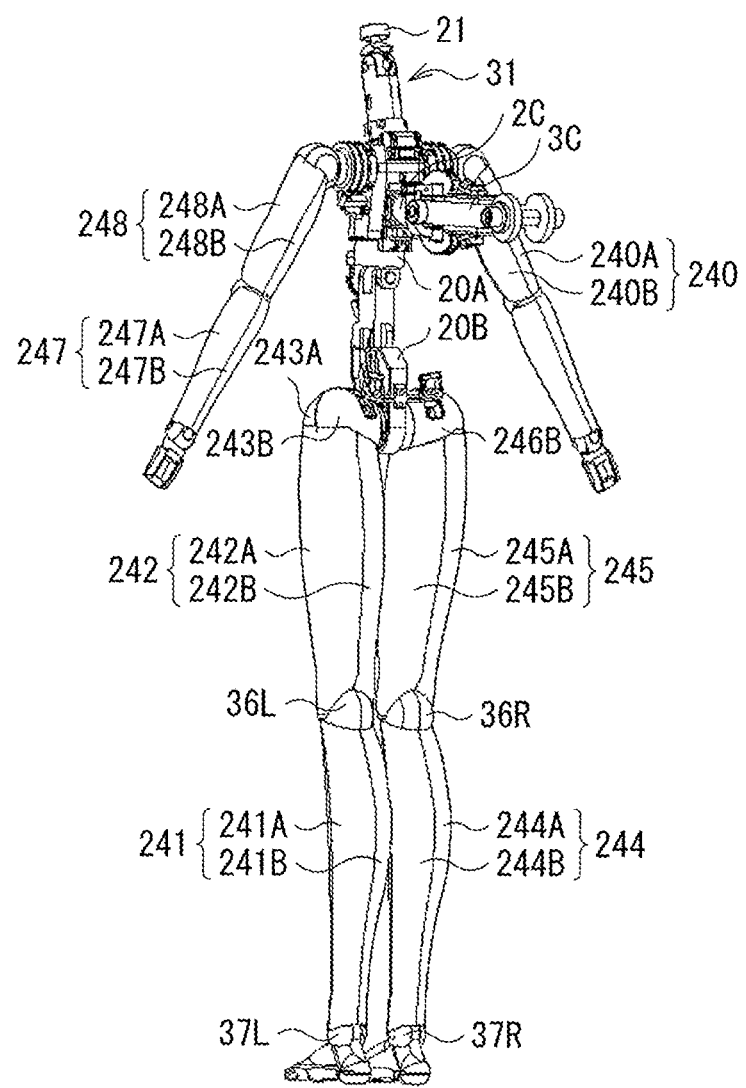

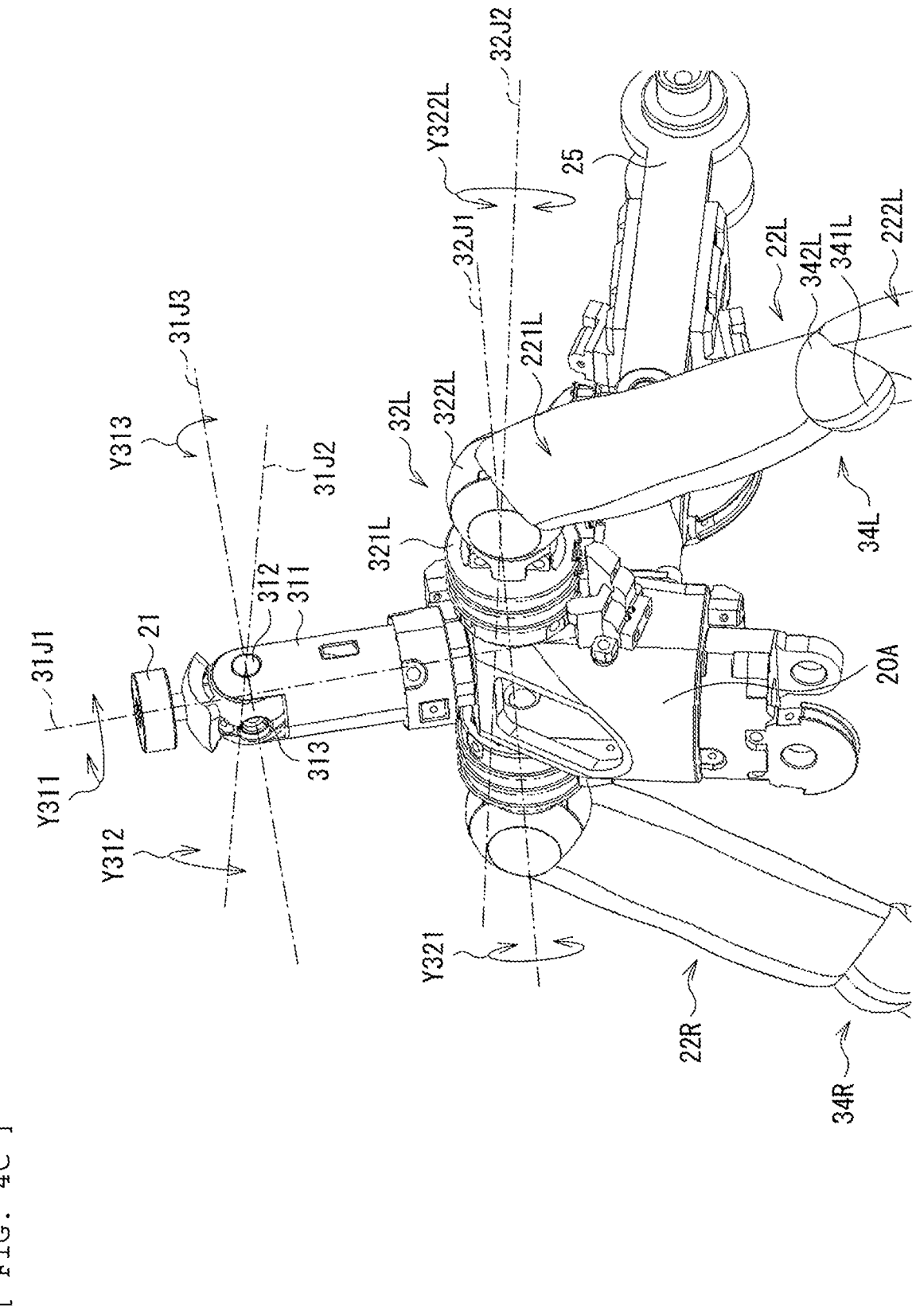
[FIG. 4C]

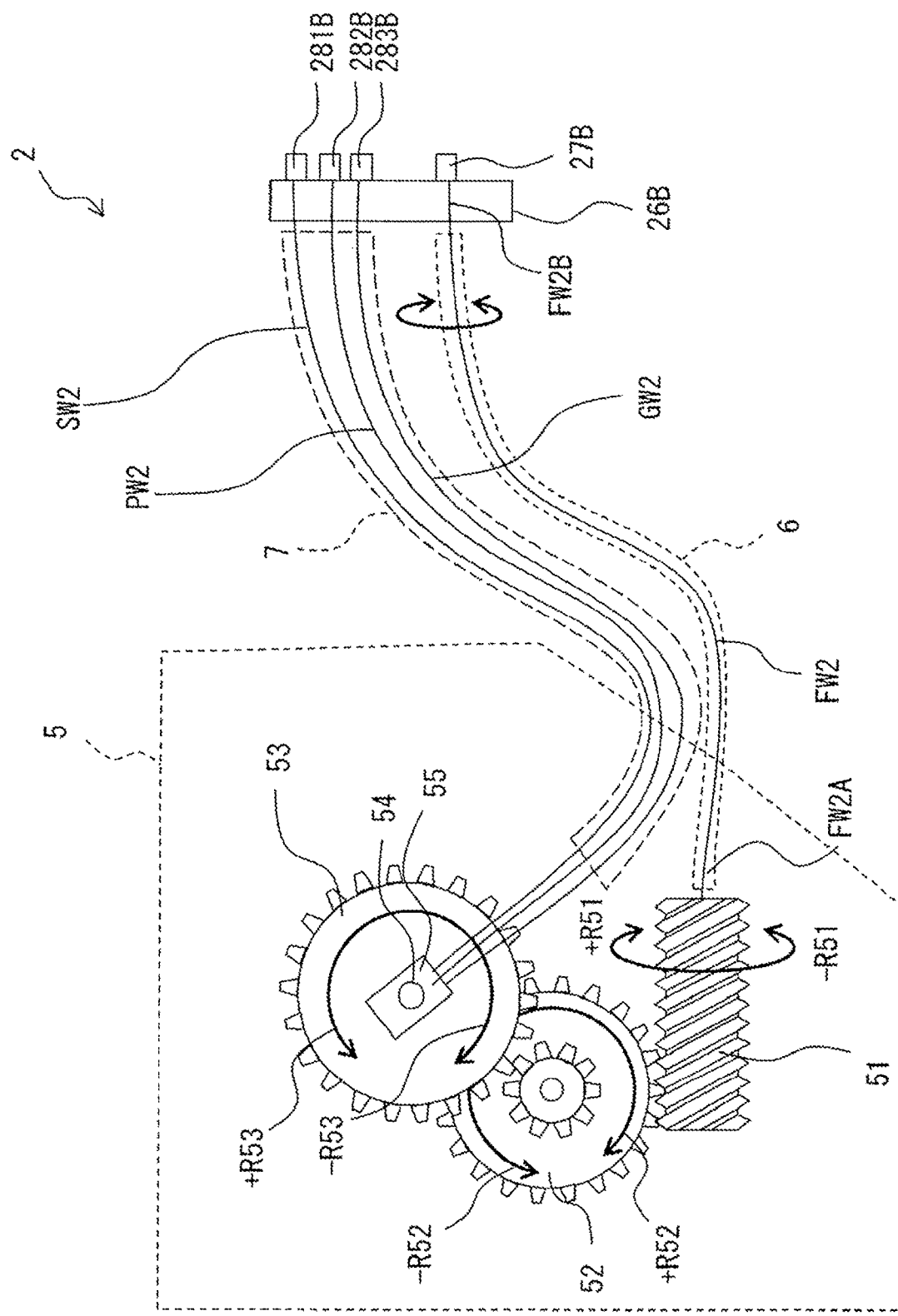
[FIG. 5]

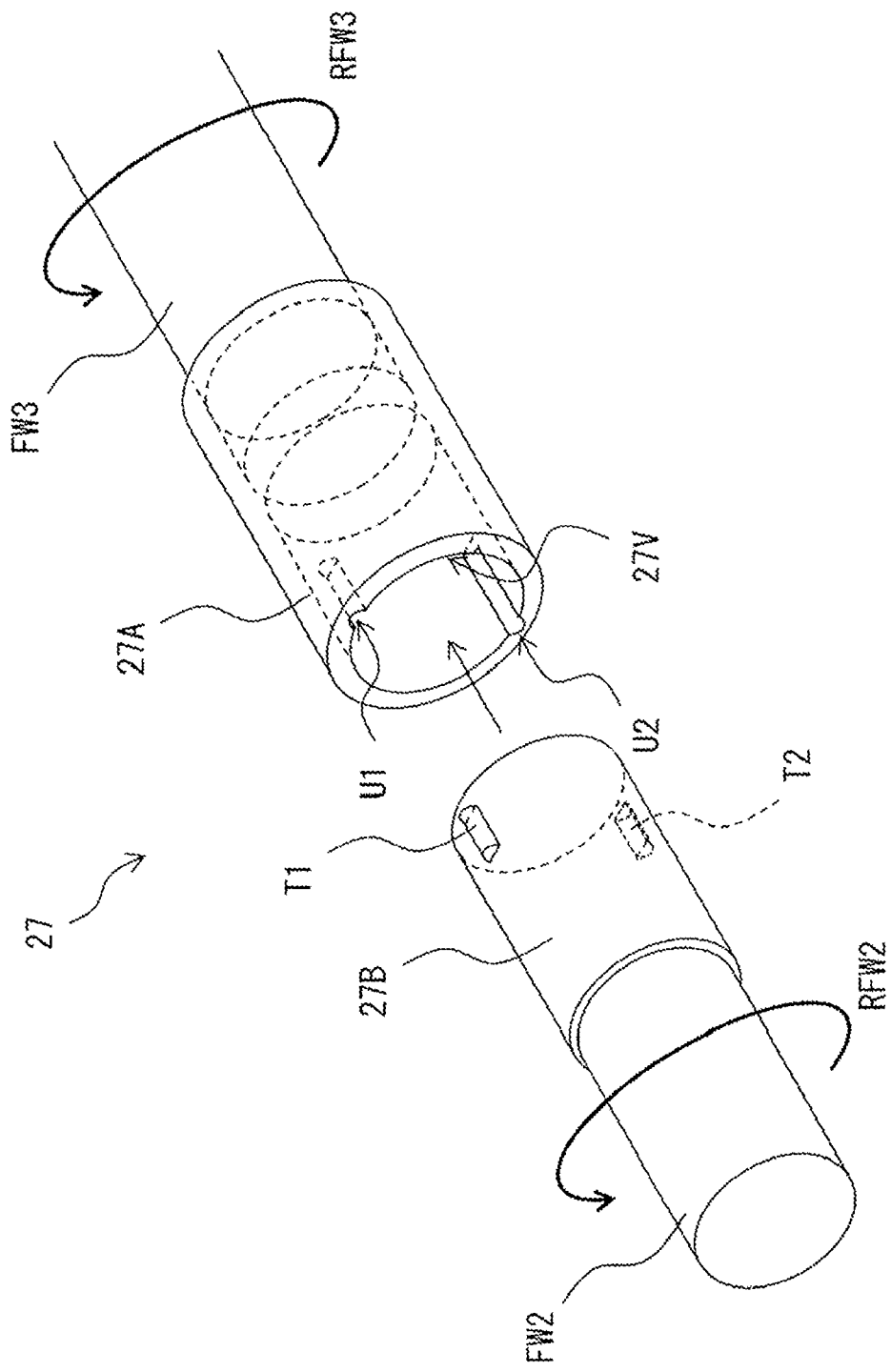
[FIG. 6]

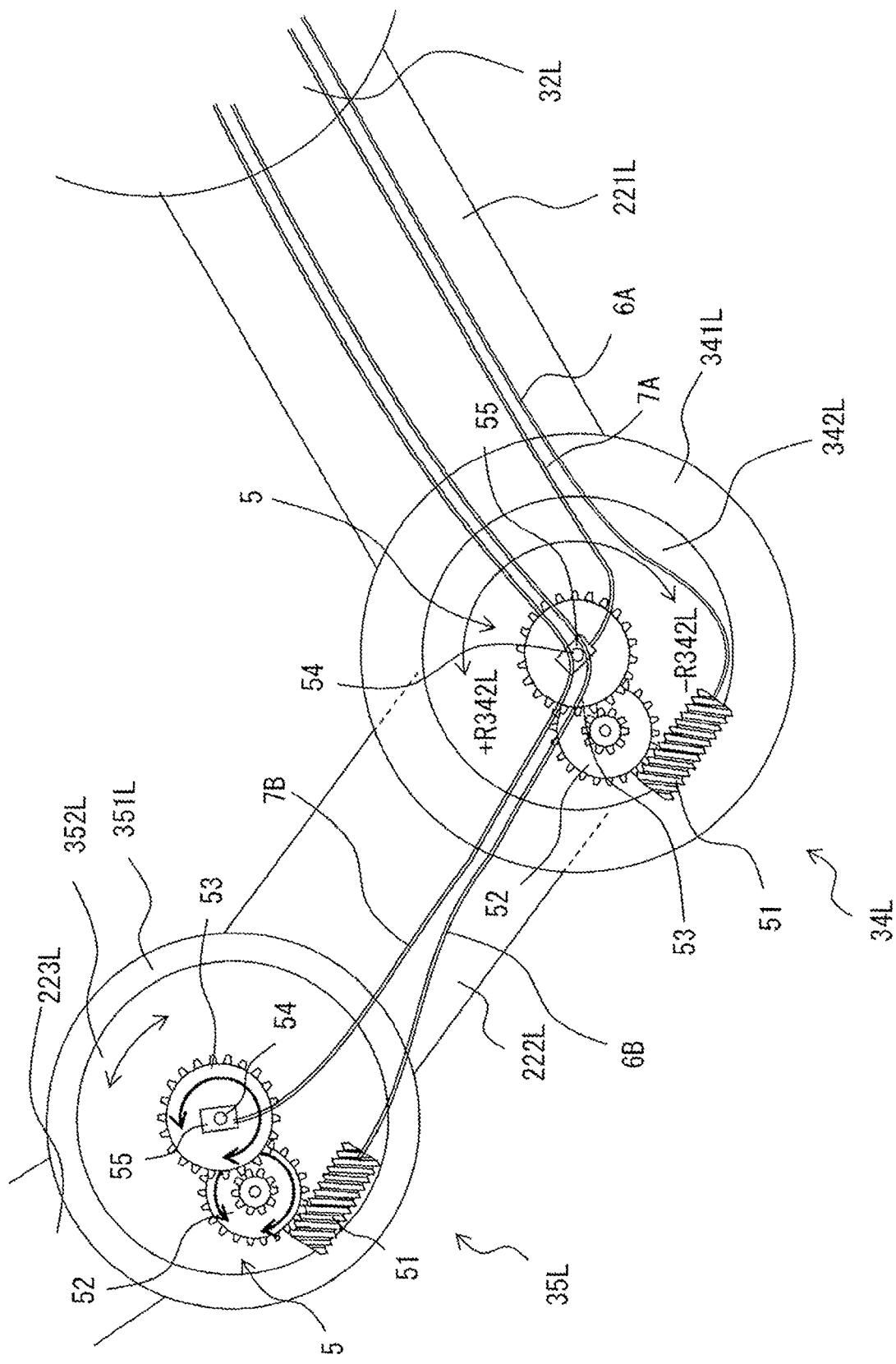

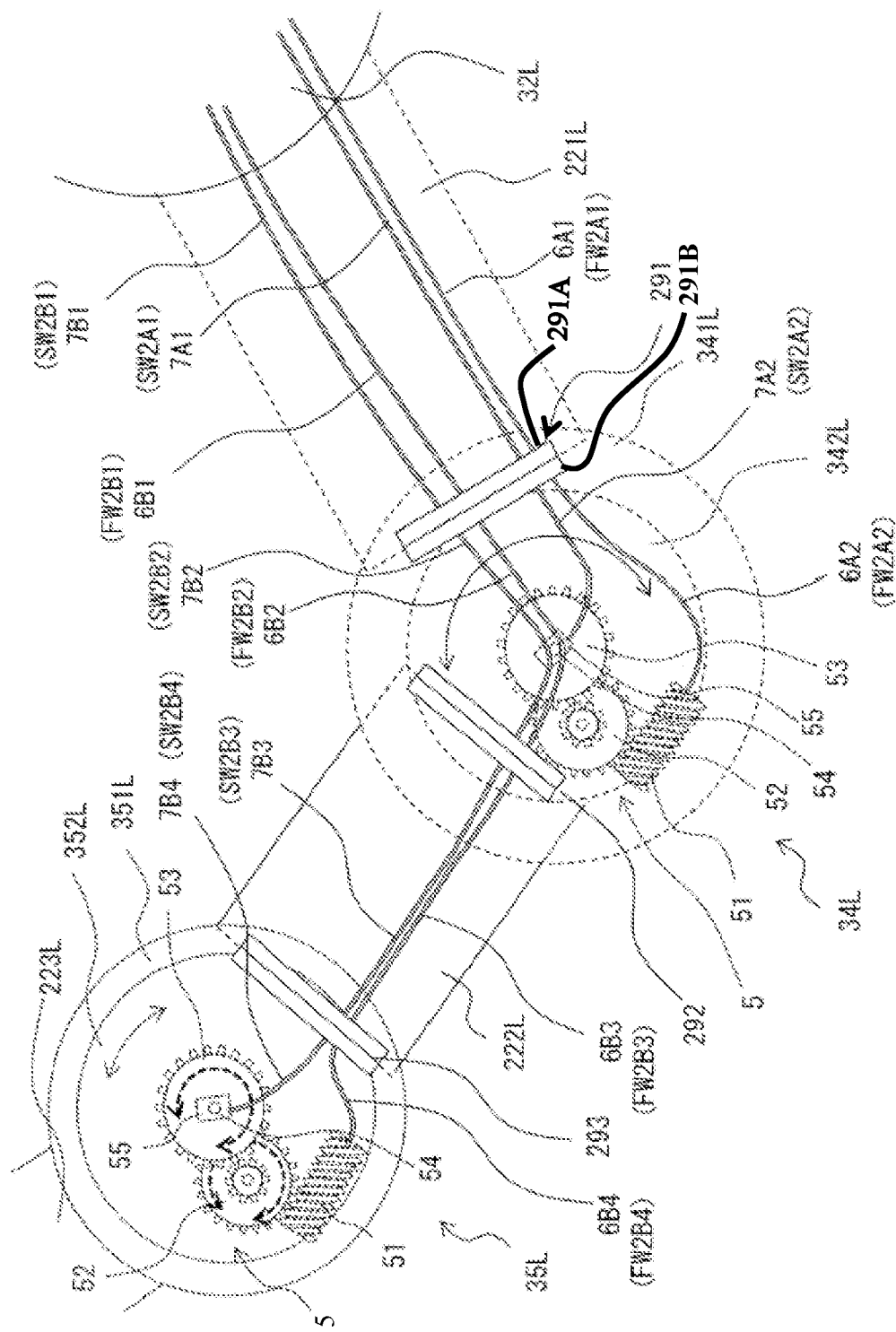
[FIG. 8]

[ FIG. 9 ]
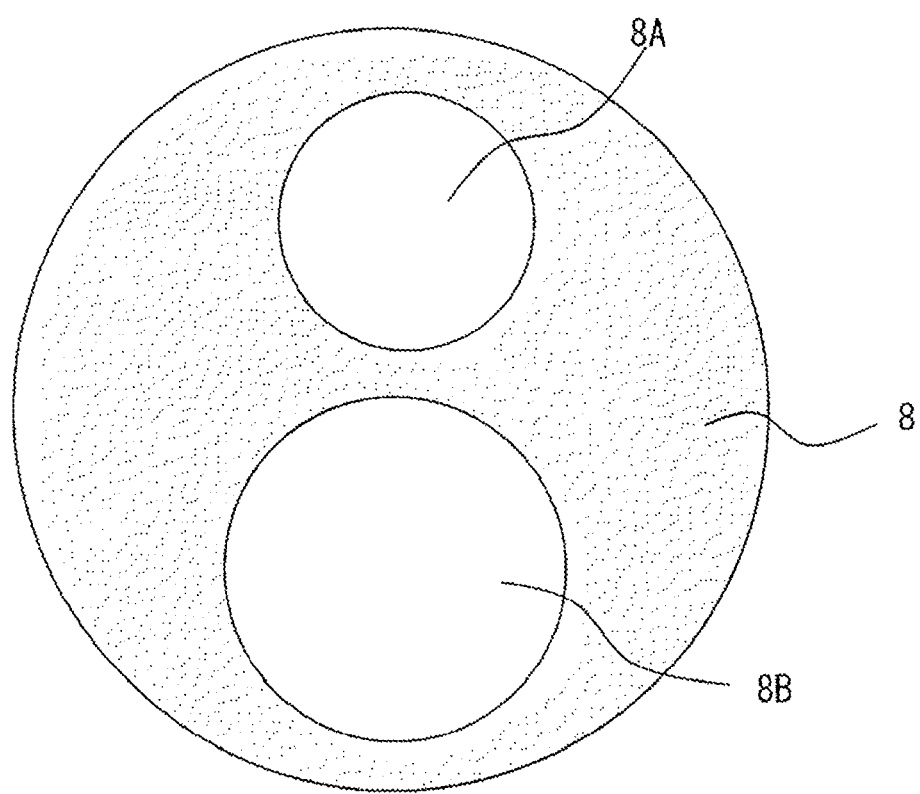

[FIG. 10]
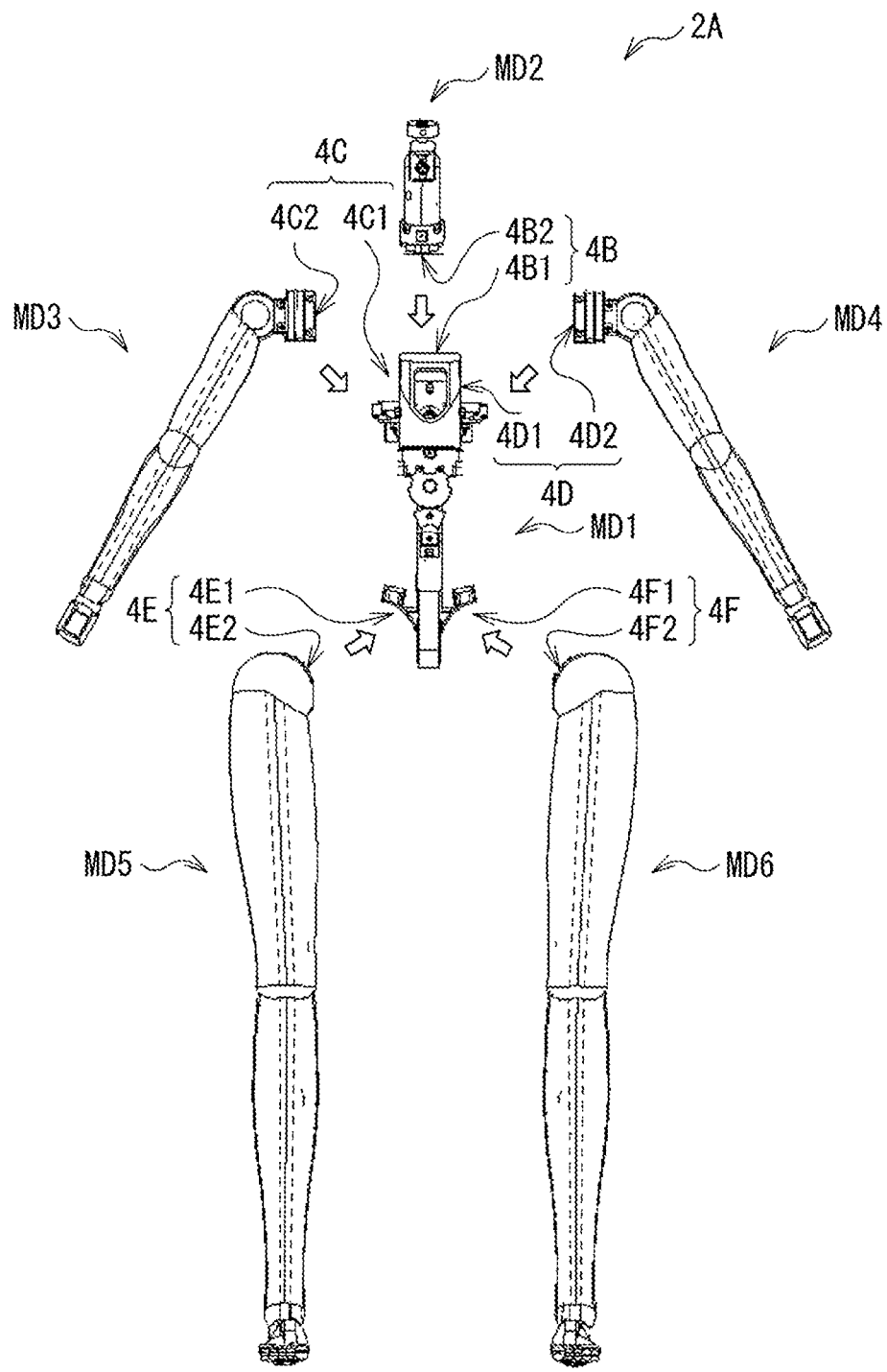

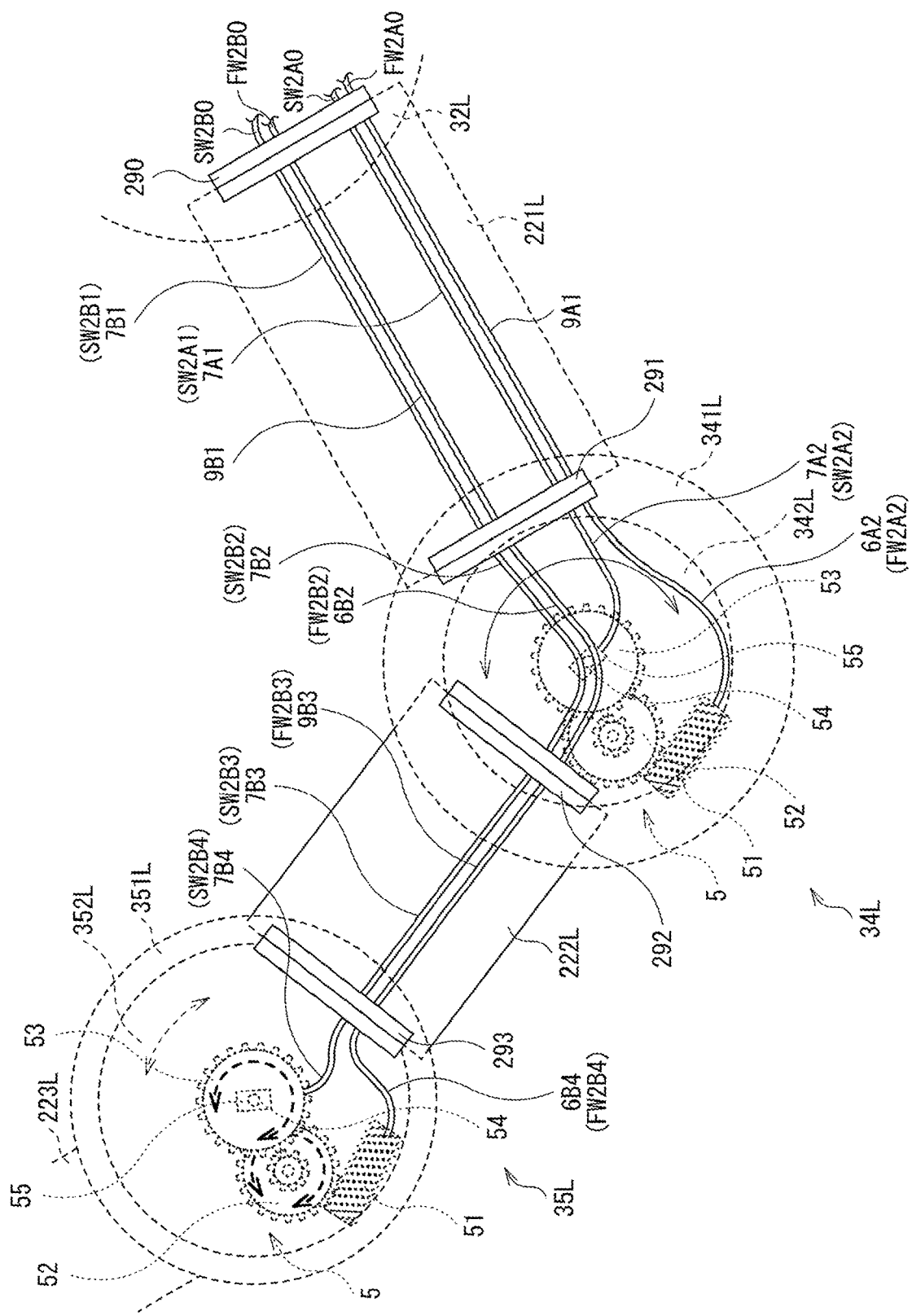
[ FIG. 11 ]

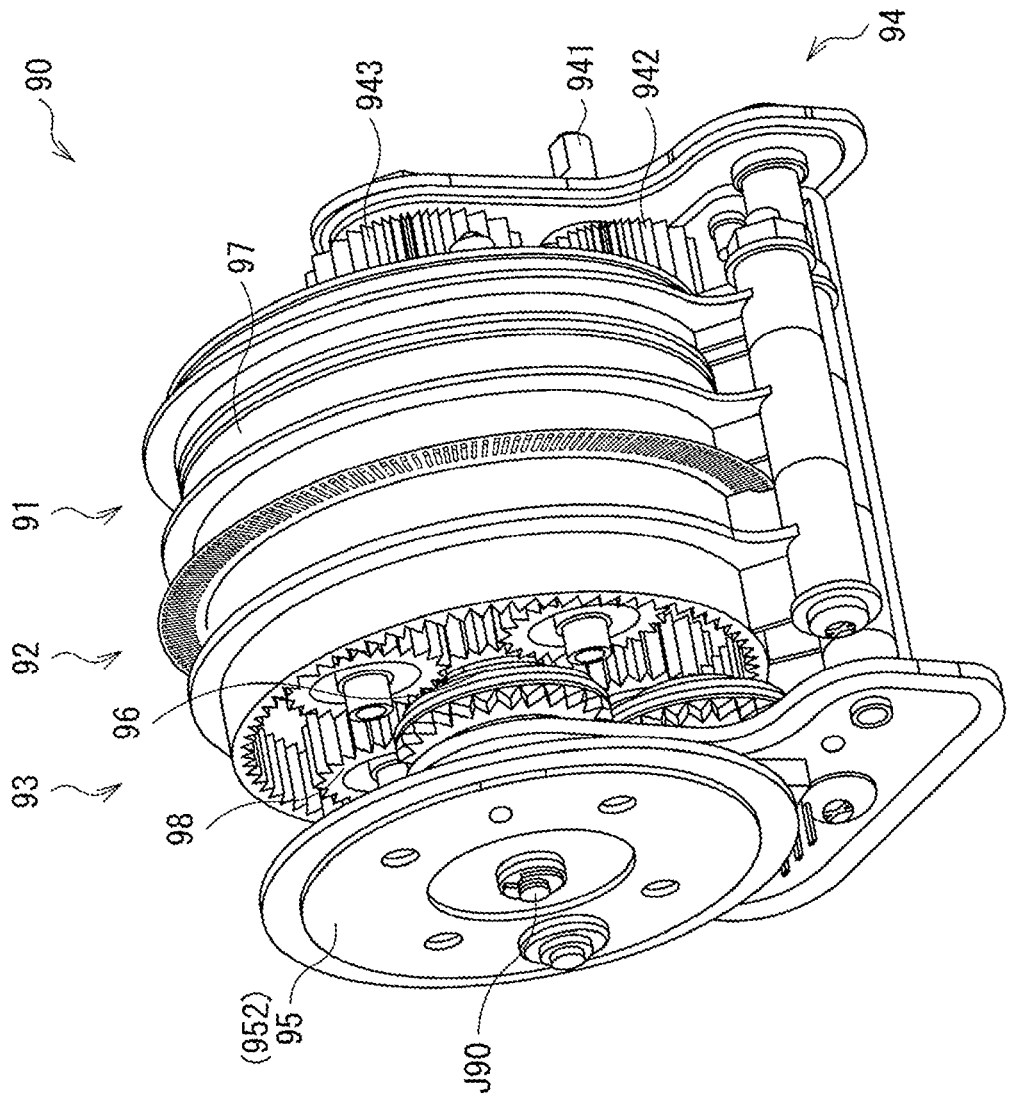
[ FIG. 12A ]

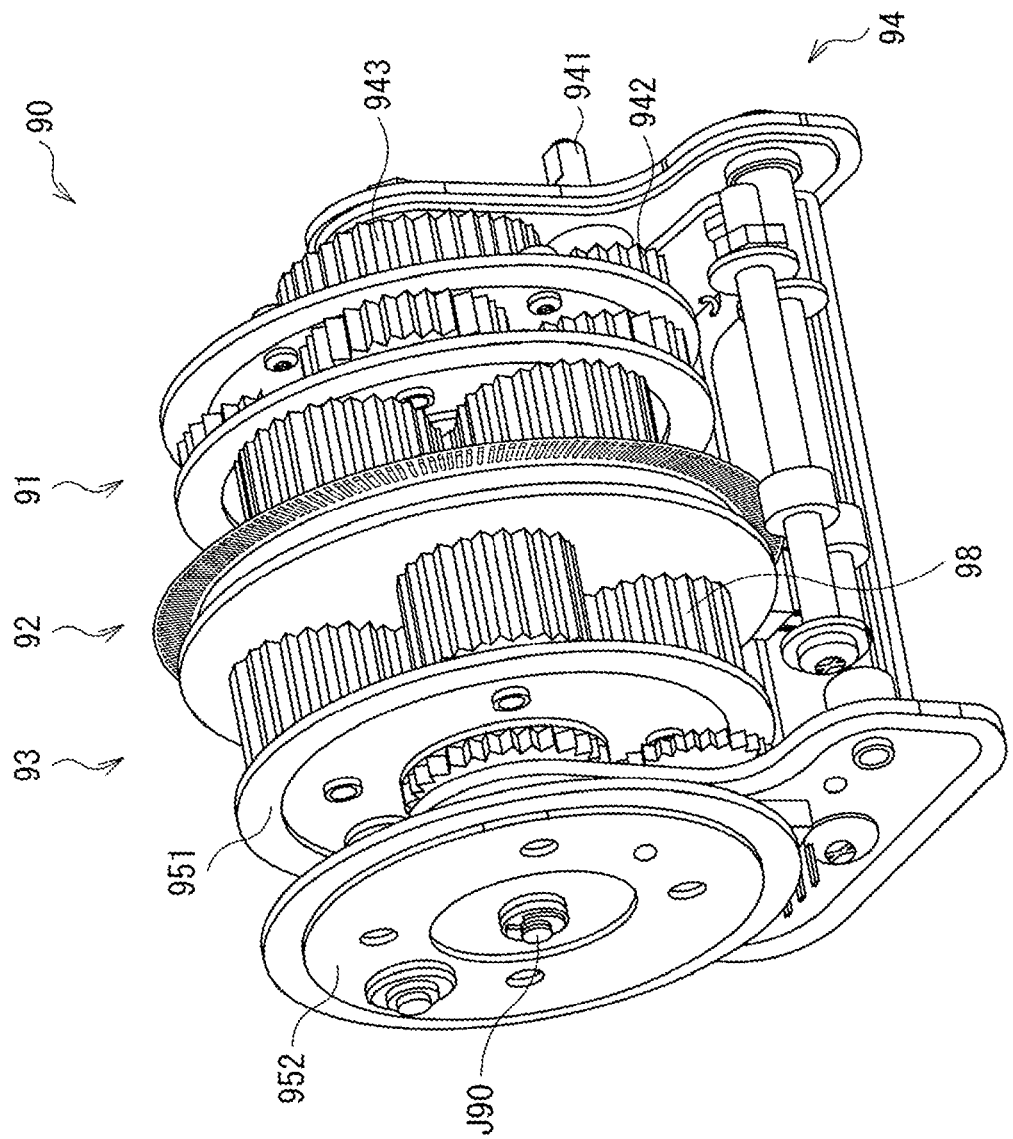
[ FIG. 12B ]

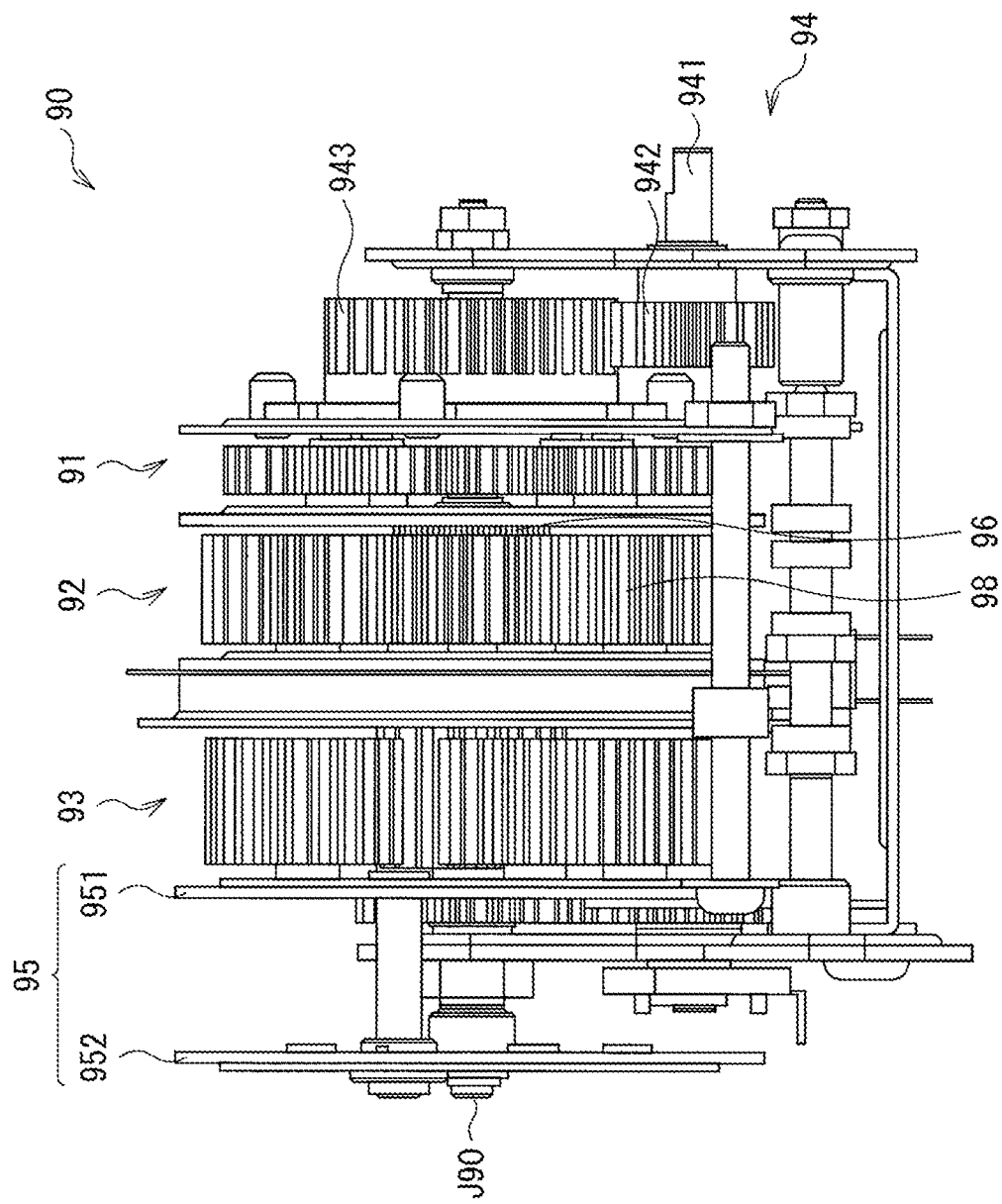
[ FIG. 12C ]

FIGURE, DRIVE UNIT, POWER MECHANISM, AND FIGURE SYSTEM

CROSS-REFERENCE TO RELATED APPLICATION

This application is a Section 371 of International Application No. PCT/JP2017/041946, filed Nov. 22, 2017, which was published in the Japanese language on May 31, 2018, under International Publication No. WO 2018/097163 A1, which claims priority under 35 U.S.C. § 119(6) to Japanese Application No. 2016-228037, filed Nov. 24, 2016, the disclosures of which are incorporated herein by reference in their entirety.

TECHNICAL FIELD

The invention relates to a movable figure system that makes it possible to perform a predetermined motion, and to a figure, a drive unit, and a power mechanism that are suitable for the figure system.

BACKGROUND ART

Figures that represent animation characters, athletes, animals, etc., as their motif have been manufactured, sold, etc., as personal luxuries, for example. The Applicant has already proposed a figure configured to transmit, with use of wires, drive force derived from drive parts to movable parts (for example, reference is made to Patent Literature 1).

CITATION LIST

Patent Literature

Patent Literature 1: International Publication No. 2015-146301

SUMMARY OF INVENTION

Incidentally, even more accurate motions are expected to be sought for such a figure depending on its application.

It is therefore desirable to provide a figure system that makes it possible to achieve a wide variety of accurate motions while ensuring aesthetic appearance, and a figure, a drive unit, and a power mechanism that are suitable for the figure system.

A first figure system according to one embodiment of the invention includes a plurality of drive units and a figure. The plurality of drive units each include an actuator that generates rotative force. The figure includes a plurality of movable mechanisms and a plurality of flexible wires. The movable mechanisms each include a movable body that operates by the rotative force and an operation amount detector that detects an amount of operation of the movable body. The flexible wires include their respective first ends that are coupled to the movable bodies. Here, the rotative force generated by one of the actuators is transmitted to corresponding one of the movable bodies through one of the flexible wires.

A second figure system according to one embodiment of the invention includes a plurality of drive units and a figure. The plurality of drive units each include an actuator that generates rotative force. The figure includes a plurality of modules that are combined with respect to each other. The modules each include a movable mechanism and a flexible wire. The movable mechanism includes a movable body that operates by the rotative force. The flexible wire includes an end coupled to the movable body. Here, the rotative force generated by one of the actuators is transmitted to corresponding one of the movable bodies through one of the flexible wires.

A third figure system according to one embodiment of the invention includes a drive unit and a figure. The drive unit includes an actuator that generates rotative force. The figure includes a movable mechanism and a flexible wire. The movable mechanism includes a movable body that operates by the rotative force and an operation amount detector that detects an amount of operation of the movable body. The flexible wire includes an end coupled to the movable body. Here, the rotative force generated by the actuator is transmitted to the movable body of the movable mechanism through the flexible wire.

A figure according to one embodiment of the invention includes: a coupler unit configured to be detachable from and attachable to a drive unit that includes a plurality of actuators, in which the actuators each generate rotative force; a plurality of movable mechanisms each including a movable body that operates by the rotative force and an operation amount detector that detects an amount of operation of the movable body; and a plurality of flexible wires including their respective ends that are coupled to the movable bodies. Here, the rotative force generated by one of the actuators is transmitted to the movable body of corresponding one of the movable mechanisms through one of the flexible wires.

A drive unit according to one embodiment of the invention includes: an actuator that generates rotative force; and a first coupler that rotates by the rotative force derived from the actuator. The first coupler is configured to be detachable from and attachable to a second coupler of a figure. The figure includes a movable mechanism, a flexible wire, and the second coupler. The movable mechanism includes a movable body that operates by the rotative force and an operation amount detector that detects an amount of operation of the movable body. The flexible wire includes one end coupled to the movable body. The second coupler is coupled to the other end of the flexible wire and is rotated.

A first power mechanism according to one embodiment of the invention includes: an actuator that generates rotative force; a movable body that operates by the rotative force; an operation amount detector that detects an amount of operation of the movable body; and a flexible wire that connects the actuator and the movable body, and transmits the rotative force generated by the actuator to the movable body. A second power mechanism according to one embodiment of the invention includes: a plurality of modules that are combined with respect to each other; and a detachment configured to be coupled to a drive unit that includes a plurality of actuators, in which the actuators each generate rotative force. The modules each include a movable body that operates by the rotative force generated by one of the actuators, an operation amount detector that detects an amount of operation of the movable body, and a flexible wire that connects the one of the actuators and the movable body, and transmits the rotative force generated by the one of the actuators to the movable body.

In the figure system, the figure, and the drive unit according to one embodiment of the invention, the drive unit includes the actuator. This eliminates the necessity of providing a drive source on the figure itself, making it suitable for achieving a reduction in size and weight saving of the figure. This also achieves the figure having superior aesthetic appearance, such as the figure having a slim body shape. Further, the rotative force derived from the actuator is transmitted to the movable body of the movable mechanism through the flexible wire, and the operation amount detector detects the amount of operation of the movable body. This achieves stabilization and high accuracy of the motion of the figure, allowing for expectations on a higher motion reproducibility. Further, adopting the flexible wire makes it possible to achieve a high degree of freedom for the motion of the figure, and to reproduce a wide variety of motions accordingly.

In the first figure system according to one embodiment of the invention, the figure may include a plurality of first tubes, and the flexible wires may be contained in and may extend through any of the first tubes, for corresponding each of the movable mechanisms. One reason is that, when any flexible wire is used to operate the movable body corresponding to that flexible wire, this prevents an interference between that flexible wire and the flexible wire that transmits the drive force to any other movable body. Thus, operability of the figure and a degree of freedom related to a posture of the figure improve, making it possible to expect a dynamic motion to be performed smoothly.

In the first figure system according to one embodiment of the invention, the drive unit may further include a first coupler unit having a plurality of first couplers, in which the first couplers may respectively rotate by the rotative force derived from the actuators, the figure may further include a second coupler unit having a plurality of second couplers, in which the second couplers may respectively be coupled to second ends of the respective flexible wires, and may respectively be configured to be rotatable, and the first couplers each may be joined detachably and attachably to corresponding one of the second couplers, or each may be configured to be joined detachably and attachably to the corresponding one of the second couplers. One reason is that this makes handling easier than a case in which the drive unit and the figure are integrated. This also ensures compatibility, making it possible to share one drive unit with the multiple figures. In this case, the first coupler unit and the second coupler unit may be joined to form a sound insulating structure that surrounds the actuators. One reason is that this ensures quietness upon operation.

In the first figure system according to one embodiment of the invention, the drive units each may further include a controller that controls, on a basis of information derived from the operation amount detector, the actuator to thereby execute an operation of the movable mechanism. Such a case may further include a plurality of signal lines that respectively connect the operation amount detectors and the controllers, and a plurality of electric power lines respectively connect the operation amount detectors and the controllers. Further, in such a case, the figure may include a plurality of first tubes and a plurality of second tubes, the flexible wires may be contained in and may extend through the first tube for corresponding each of the movable bodies, and at least a part of the signal lines and at least a part of the electric power lines may be contained in and may extend through the second tube for the corresponding each of the movable bodies. One reason is that this makes it easier to prevent an interference between the flexible wires, the signal lines, and the electric power lines corresponding to one of the movable bodies and the flexible wires, the signal lines, and the electric power lines corresponding to any other movable body.

Effects of Invention

According to the figure system of one embodiment of the invention, it is possible to ensure aesthetic appearance of the figure, as well as to achieve a wide variety of motions. In addition, according to the figure, the drive unit, or the power mechanism of one embodiment of the invention, it is possible to use them for the figure system suitably. Further, according to the power mechanism of one embodiment of the invention, it is possible to achieve a wide variety of motions while ensuring a higher degree of design freedom. Note that effects of the invention are not limited thereto. Any of effects to be described hereinbelow may be exhibited as well.

BRIEF DESCRIPTION OF DRAWINGS

FIG. 1 is a schematic diagram illustrating an overall configuration of a figure system according to a first embodiment.

FIG. 2A is an explanatory diagram for describing an internal mechanism of the figure system illustrated in FIG. 1.

FIG. 2B is an explanatory diagram for describing a main part of the figure system illustrated in FIG. 1.

FIG. 3 is a block diagram for describing an internal mechanism of a drive unit illustrated in FIG. 1.

FIG. 4A is a schematic diagram illustrating an appearance of and a framework inside the figure illustrated in FIG. 1.

FIG. 4B is a schematic diagram illustrating an appearance of the figure illustrated in FIG. 1 as viewed obliquely from the rear side.

FIG. 4C is a schematic diagram illustrating, in an enlarged fashion, an appearance of an upper part of the figure illustrated in FIG. 1.

FIG. 5 is a conceptual diagram describing how power is transmitted from the drive unit to a movable mechanism in the figure system illustrated in FIG. 1.

FIG. 6 is an enlarged perspective view of a coupler pair in the figure system illustrated in FIG. 1.

FIG. 7 is a conceptual diagram describing an operation of joints of the figure system illustrated in FIG. 1.

FIG. 8 is a conceptual diagram describing a structure near the joints of the figure according to a first modification example.

FIG. 9 is a schematic diagram describing a structure of a tube of the figure according to a second modification example.

FIG. 10 is a schematic diagram describing a structure of a figure according to a third modification example.

FIG. 11 is a conceptual diagram describing a structure near the joints of the figure according to a fourth modification example.

FIG. 12A is a perspective view of an appearance of a reduction mechanism provided at a joint of the figure according to a fifth modification example.

FIG. 12B is a perspective view of an internal structure of the reduction mechanism illustrated in FIG. 12A.

FIG. 12C is a front view of the internal structure of the reduction mechanism illustrated in FIG. 12A.

DESCRIPTION OF EMBODIMENTS

In the following, some embodiments of the invention are described in detail with reference to the drawings. Note that the description will be given in the following order.

1. Embodiment (a figure system having a basic structure)
   (1) Example of Basic Configuration of Figure System
   (2) Example of Detailed Configuration of Joints
   (3) Example of Basic Operation of Figure System
   (4) Example of Operation of Joint
   (5) Workings and Effects
2. Modification Examples

1. One Embodiment

1. Example of Basic Configuration of Figure System

FIG. 1 is a perspective view of an appearance of an overall configuration of a figure system according to an embodiment of the invention. FIG. 2A is an explanatory diagram for describing a mechanism of the entire figure system according to the present embodiment. FIG. 2B is an explanatory diagram for describing a main part of the figure system illustrated in FIG. 1. FIG. 3 is a block diagram for describing an internal mechanism of a drive unit DU (described later) illustrated in FIG. 1. FIG. 4A is a schematic diagram illustrating an appearance of and a framework inside a FIG. 2 illustrated in FIG. 1. FIG. 4B is a schematic diagram illustrating an appearance of the FIG. 2 as viewed obliquely from the rear side. FIG. 4C is a schematic diagram illustrating, in an enlarged fashion, an appearance of an upper part of the FIG. 2.

Referring to FIG. 1, the figure system according to the present embodiment includes a base 1, the FIG. 2 disposed on the base 1, and an intermediate part 3 that joins or is configured to join the base 1 and the FIG. 2 together detachably and attachably. The intermediate part 3 supports the FIG. 2 above the base 1 to allow the FIG. 2 to operate freely using a torso 20 (described later) as a point of support.

For example, the FIG. 2 may include, as its bone members, the torso 20, a head 21, a right arm 22R, a left arm 22L, a right leg 23R, and a left leg 23L (see FIGS. 1, 4A, and 4B). These bone members each may be made of a high-stiffness material having a shape such as a plate shape and a bar shape. A cross-section that is orthogonal to a longitudinal direction of any bone member may have a shape such as circle, ellipse, or polygon including quadrangle. In addition, the bone member may have a solid structure; however, it is desirable that the bone member have a hollow structure for weight saving. The torso 20 may have a configuration in which an upper torso 20A and a lower torso 20B are coupled together through a waist joint 30, for example. A back of the upper torso 20A is provided with a multi-coupler 25B. The multi-coupler 25B is coupled to a multi-coupler 25A provided at the intermediate part 3 and thus forms a multi-coupler pair 25, thereby coupling the torso 20 (the upper torso 20A) and the intermediate part 3 together. The head 21, the right arm 22R, the left arm 22L, the right leg 23R, and the left leg 23L are respectively coupled to the torso 20 by a neck joint 31, a shoulder joint 32R, a shoulder joint 32L, a hip joint 33R, and a hip joint 33L that serve as joints. The plurality of bone members are coupled through the plurality of joints in this way in the FIG. 2, thereby forming a framework. Here, these joints each include one or a plurality of movable mechanisms 5 to be described later. Note that the right arm 22R, the left arm 22L, the right leg 23R, and the left leg 23L are provided with covers 240 to 249 so as to incorporate therein the bone members. The covers 240 to 249 are each equivalent to a skin. For example, the covers 240 to 249 are each made of a hard resin such as polyvinyl chloride (PVC), and each have an outer surface that includes a curved surface.

The right arm 22R includes an upper arm 221R, a forearm 222R, and a hand 223R. The upper arm 221R has one end coupled to a right end of the upper torso 20A through the shoulder joint 32R, and the other end coupled to the forearm 222R by an elbow joint 34R. The forearm 222R has one end coupled to the upper arm 221R through the elbow joint 34R, and the other end coupled to the hand 223R by a hand joint 35R. The hand 223R has one end coupled to the forearm 222R through the hand joint 35R, and the other end provided with, for example, five fingers. The upper arm 221R has its own circumference covered with a cover 240A and a cover 240B, and the forearm 222R has its own circumference covered with a cover 249A and a cover 249B.

The left arm 22L has a structure that bears a symmetrical relationship to the right arm 22R about the torso 20. Specifically, the left arm 22L includes an upper arm 221L, a forearm 222L, and a hand 223L. The upper arm 221L has one end coupled to a left end of the upper torso 20A through the shoulder joint 32L, and the other end coupled to the forearm 222L by an elbow joint 34L. The forearm 222L has one end coupled to the upper arm 221L through the elbow joint 34L, and the other end coupled to the hand 223L by a hand joint 35L. The hand 223L has one end coupled to the forearm 222L through the hand joint 35L, and the other end provided with, for example, five fingers. The upper arm 221L has its own circumference covered with a cover 248A and a cover 248B, and the forearm 222L has its own circumference covered with a cover 247A and a cover 247B.

The right leg 23R includes a thigh 231R, a lower leg 232R, and a foot 233R. The thigh 231R has one end coupled to a right end of the lower torso 20B through the hip joint 33R, and the other end coupled to the lower leg 232R by a knee joint 36R. The lower leg 232R has one end coupled to the thigh 231R through the knee joint 36R, and the other end coupled to the foot 233R by an ankle joint 37R. The foot 233R has one end coupled to the lower leg 232R through the ankle joint 37R, and the other end provided with, for example, five fingers. The thigh 231R has its own circumference covered with a cover 245A and a cover 245B, and the lower leg 232R has its own circumference covered with a cover 244A and a cover 244B.

The left leg 23L has a structure that bears a symmetrical relationship to the right leg 23R about the torso 20. Specifically, the left leg 23L includes a thigh 231L, a lower leg 232L, and a foot 233L. The thigh 231L has one end coupled to a left end of the lower torso 20B through the hip joint 33L, and the other end coupled to the lower leg 232L by a knee joint 36L. The lower leg 232L has one end coupled to the thigh 231L through the knee joint 36L, and the other end coupled to the foot 233L by an ankle joint 37L. The foot 233L has one end coupled to the lower leg 232L through the ankle joint 37L, and the other end provided with, for example, five fingers. The thigh 231L has its own circumference covered with a cover 242A and a cover 242B, and the lower leg 232L has its own circumference covered with a cover 241A and a cover 241B.

In the present embodiment, the waist joint 30, the neck joint 31, the shoulder joints 32R and 32L, the hip joints 33R and 33L, the elbow joints 34R and 34L, the hand joints 35R and 35L, the knee joints 36R and 36L, and the ankle joints 37R and 37L are collectively referred to as joints. Note that any location other than those described above, such as a finger, may also be provided with a joint. Among those joints, the shoulder joints 32R and 32L, the hip joints 33R and 33L, the elbow joints 34R and 34L, the hand joints 35R and 35L, the knee joints 36R and 36L, and the ankle joints 37R and 37L each may include a rotary member. The rotary member rotates around a rotary shaft, and has a cross section, orthogonal to the rotary shaft, at least a part of which is in the shape of an arc. For example, as illustrated in FIG. 7 to be described later, the elbow joint 34L and the hand joint 35L may respectively include a rotary member 342L and a rotary member 352L. The rotary members 342L and 352L each rotate around an output shaft 54, and has a cross section, orthogonal to the output shaft 54, at least a part of which is in the shape of an arc. In particular, the shoulder joints 32R and 32L, the hip joints 33R and 33L, the elbow joints 34R and 34L, the hand joints 35R and 35L, the knee joints 36R and 36L, and the ankle joints 37R and 37L each may be covered with a substantially-spherical cover. The substantially-spherical cover has an outer surface that includes a spherical surface. For example, FIG. 4A and FIG. 4B illustrate a state in which the hip joints 33R and 33L are respectively covered with substantially-spherical covers 243 and 246 each having the outer surface that includes the spherical surface.

As illustrated in FIGS. 2A, 2B, and 3, the FIG. 2 includes a plurality of movable mechanisms 5, a plurality of coupler units 26B, a plurality of flexible wires FW2, a plurality of signal lines SW2, a plurality of electric power lines PW2, and a plurality of grounding lines GW2 (FIG. 2A). The flexible wire FW2 is a power transmitting member (a rotative force transmitting member) that transmits, as a result of rotation with its extending direction being a rotation axis, rotative force generated by a drive motor DM to a movable body (for example, a worm gear 51 to be described later) of the movable mechanism 5. For example, the flexible wire FW2 is structured by a flexible material having a strand of metal thin wires such as steel wires. The flexible wire FW2 is also referred to as a flexible shaft, and one flexible wire FW2 is provided for each movable mechanism 5. One signal line SW2, one electric power line PW2, and one grounding line GW2 are provided for each movable mechanism 5 as well. FIG. 5 schematically illustrates a configuration example for describing an operation mechanism of the FIG. 2 having the movable mechanism 5.

As illustrated in FIG. 5, etc., the movable mechanisms 5 each include a reduction gear 53 and an encoder 55. The reduction gear 53 serves as a movable body that operates by the rotative force of the later-described drive motor DM. The encoder 55 detects an amount of operation (for example, an angle of rotation) of the reduction gear 53. More specifically, the movable mechanisms 5 each include the worm gear 51, a reduction gear 52, the reduction gear 53, the output shaft 54, and the encoder 55. Here, the worm gear 51 is coupled to an end 2T1 of the flexible wire FW2, and is made rotatable, with its extending direction being a rotation axis, in a +R51 direction and in a −R51 direction together with the flexible wire FW2. The reduction gear 52 is in engagement with the worm gear 51. For example, the reduction gear 52 is rotated in a +R52 direction when the worm gear 51 rotates in the +R51 direction, and is rotated in a −R52 direction when the worm gear 51 rotates in the −R51 direction. The reduction gear 53 is in engagement with the reduction gear 52. For example, the reduction gear 53 is rotated in a +R53 direction when the reduction gear 52 rotates in the +R52 direction, and is rotated in a −R53 direction when the reduction gear 52 rotates in the −R52 direction. An amount of rotation (an angle of rotation) of the reduction gear 53 is detected on an as-needed basis by the encoder 55. The output shaft 54 is fixed at the center of rotation of the reduction gear 53, and rotates integrally with the reduction gear 53. A rotary member 56 is fixed to the output shaft 54, and rotates integrally with the reduction gear 53 accordingly.

In addition, an end 2T2 of the flexible wire FW2, positioned on the opposite side of the worm gear 51, is coupled to a wire coupler 27B as illustrated in FIGS. 2A and 3. The wire coupler 27B is rotatably held by the coupler unit 26B, and is rotated together with the flexible wire FW2. The wire coupler 27B is made detachable from and attachable to a wire coupler 27A to be described later, and is coupled to the wire coupler 27A to thereby form a wire coupler pair 27, as illustrated by way of example in FIG. 6. Note that FIG. 6 is an enlarged perspective view of a configuration of the wire coupler pair 27. For example, the wire coupler 27B is a substantially-columnar member, and has one or more protrusions (two protrusions T1 and T2 in FIG. 6) on its outer peripheral surface, as illustrated in FIG. 6. The wire coupler 27A is a member that is coupled to, for example, an end 3T2 of a flexible wire FW3 that passes through the intermediate part 3, and that includes a substantially-cylindrical part having a space 27V into which the wire coupler 27B is inserted, for example. The wire coupler 27A has, on its inner surface, one or more grooves (two grooves U1 and U2 in FIG. 6) that correspond to the projections of the wire coupler 27B. Such a structure allows the wire coupler 27A and the wire coupler 27B to so come close to each other that the projections T1 and T2 are respectively fitted into the grooves U1 and U2 and thus allows the wire coupler 27B to be inserted into the space 27V. Accordingly, the projections T1 and T2 and the grooves U1 and U2 are in engagement with each other respectively, causing the flexible wire FW2 to be rotated in a direction of RFW2 when, for example, the flexible wire FW3 is rotated in a direction of RFW3.

The coupler unit 26B also holds a signal line coupler 281B, an electric power line coupler 282B, and a grounding line coupler 283B. The FIG. 2 is also disposed with the signal line SW2 that connects the signal line coupler 281B and the encoder 55, the electric power line PW2 that connects the electric power line coupler 282B and the encoder 55, and the grounding line GW2 that connects the grounding line coupler 283B and the encoder 55. Here, the flexible wire FW2 may be contained in a flexible tube 6 for each of the corresponding movable mechanisms 5, and the signal line SW2, the electric power line PW2, and the grounding line GW2 may be contained in a flexible tube 7 for each of the corresponding movable mechanisms 5 (see FIG. 5). One reason is to prevent a mutual interference. In particular, the flexible wire FW2 involves a rotary operation and thus would more likely to cause a friction or an interference with respect to the signal line SW2, etc. Accordingly, it is desirable that the flexible wire FW2 and the signal, the electric power, and the grounding lines SW2, PW2, and GW2 be inserted into the respective separate tubes. The signal line SW2, the electric power line PW2, and the grounding line GW2, however, may be individually inserted into the tubes that are different from each other.

The FIG. 2 is provided with the plurality of coupler units 26B corresponding to the respective movable mechanisms 5. The plurality of coupler units 26B are integrated and thus configure the multi-coupler 25B. Note that the FIG. 2 may be so configured that all of the coupler units 26B are grouped together to configure the single multi-coupler 25B, or may be grouped into some groups to configure the plurality of multi-couplers 25B. The multi-coupler 25B is made detachable from and attachable to the later-described multi-coupler 25A of the intermediate part 3, and is coupled to the multi-coupler 25A to thereby form the multi-coupler pair 25.

The intermediate part 3 includes a stay 3A, the flexible wire FW3, a signal line SW3, an electric power line PW3, a grounding line GW3, a coupling part 3B, and a coupling part 3C. The stay 3A supports the FIG. 2 with respect to the base 1. The flexible wire FW3, the signal line SW3, the electric power line PW3, and the grounding line GW3 are inserted through the inside of the stay 3A. The coupling part 3B is provided at one end of the stay 3A, and couples the stay 3A and a housing 10 of the base 1 together. The coupling part 3C is provided at the other end of the stay 3A, and couples the stay 3A and a coupling part 2C of the FIG. 2 together. The coupling part 3B is provided with one or a plurality of multi-couplers 16B, whereas the coupling part 3C is provided with one or the plurality of multi-couplers 25A. The flexible wire FW3 is a flexible power transmitting member that transmits, to the FIG. 2, the rotative force generated by the drive motor DM. For example, the flexible wire FW3 is structured by a material similar to that of the flexible wire FW2. An end 3T1 of the flexible wire FW3 is coupled to the wire coupler 27A, and an end 3T2 of the flexible wire FW3 is coupled to a wire coupler 18B. One end of the signal line SW3 is coupled to a signal line coupler 281A, and the other end of the signal line SW3 is coupled to a signal line coupler 191B. One end of the electric power line PW3 is coupled to an electric power line coupler 282A, and the other end of the electric power line PW3 is coupled to an electric power line coupler 192B. One end of the grounding line GW3 is coupled to a grounding line coupler 283A, and the other end of the grounding line GW3 is coupled to a grounding line coupler 193B. Here, as described previously, the wire coupler 27A is made detachable from and attachable to the wire coupler 27B of the FIG. 2, and is coupled to the wire coupler 27B to thereby form the wire coupler pair 27. Meanwhile, the wire coupler 18B is made detachable from and attachable to a wire coupler 18A (described later) provided at the base 1, and is coupled to the wire coupler 18A to thereby form a wire coupler pair 18. Similarly, the signal line coupler 281A, the electric power line coupler 282A, and the grounding line coupler 283A and the signal line coupler 281B, the electric power line coupler 282B, and the grounding line coupler 283B of the FIG. 2 are respectively made detachable from and attachable to each other, and are respectively coupled to each other to thereby form a signal line coupler pair 281, an electric power line coupler pair 282, and a grounding line coupler pair 283, respectively. Further, the signal line coupler 191B, the electric power line coupler 192B, and the grounding line coupler 193B are respectively made detachable from and attachable to a signal line coupler 191A, an electric power line coupler 192A, and a grounding line coupler 193A that are provided at the base 1, and they are respectively coupled to each other to thereby form a signal line coupler pair 191, an electric power line coupler pair 192, and a grounding line coupler pair 193, respectively.

The coupler unit 26A rotatably holds the wire coupler 27A. The coupler unit 26A also holds each of the signal line coupler 281A, the electric power line coupler 282A, and the grounding line coupler 283A. The coupler unit 26A is coupled to the coupler unit 26B to thereby form a coupler unit pair 26. The coupling part 3C of the intermediate part 3 is provided with the plurality of coupler units 26A. The plurality of coupler units 26A are integrated and thus configure the multi-coupler 25A. Note that the coupling part 3C of the intermediate part 3 may be so configured that all of the coupler units 26A are grouped together to configure the single multi-coupler 25A, or may be grouped into some groups to configure the plurality of multi-couplers 25A. The multi-coupler 25A is made detachable from and attachable to the multi-coupler 25B of the FIG. 2, and is coupled to the multi-coupler 25B to thereby form the multi-coupler pair 25.

The coupling part 3B is provided with the multi-coupler 16B. The multi-coupler 16B is so provided as to face the multi-coupler 16A provided at the housing 10 of the base 1, as illustrated in FIG. 2B. The multi-coupler 16B is made detachable from and attachable to the multi-coupler 16A, and is coupled to the multi-coupler 16A to thereby form a multi-coupler pair 16. The multi-coupler 16B is configured by a plurality of coupler units 17B. FIG. 2B exemplifies a case in which the multi-coupler 16B is configured by three coupler units 17B1 to 17B3 and in which the multi-coupler 16A is configured by three coupler units 17A1 to 17A3. The coupler unit 17B (17B1 to 17B3) rotatably holds the wire coupler 18B (18B1 to 18B3). The coupler unit 17B (17B1 to 17B3) also holds each of the signal line coupler 191B (191B1 to 191B3), the electric power line coupler 192B (192B1 to 192B3), and the grounding line coupler 193B (193B1 to 193B3). The coupler unit 17B (17B1 to 17B3) is coupled to the coupler unit 17A (17A1 to 17A3) provided at the base 1 to thereby form a coupler unit pair 17 (17-1 to 17-3). Note that the coupling part 3B of the intermediate part 3 may be so configured that all of the coupler units 17B are grouped together to configure the single multi-coupler 16B, or may be grouped into some groups to configure the plurality of multi-couplers 16B. Incidentally, illustrations of the flexible wire FW3, the signal line SW3, the electric power line PW3, and the grounding line GW3 are omitted in FIG. 2B.

As illustrated in FIG. 1, the base 1 is provided with the plurality of drive units DU inside the housing 10. The plurality of drive units DU each include the drive motor DM, a motor controller MC, the multi-coupler 16A, and an interface 15 (FIG. 3), as illustrated in FIGS. 2A, 2B, and 3. The drive motor DM serves as an actuator that generates the rotative force. The motor controller MC controls the drive motor DM to thereby execute an operation of the movable mechanism 5 of the FIG. 2.

The motor controller MC functions to control the drive motor DM on the basis of information derived from the encoder 55 and thereby execute the operation of the movable mechanism 5. For example, in a case where the certain movable mechanism 5 is rotated, the motor controller MC determines, from the information derived from the encoder 55, whether that movable mechanism 5 is actually rotated by a desired angle of rotation, and further performs, on an as-needed basis, an operation that corrects the angle of rotation.

As illustrated in FIG. 2B, the multi-coupler 16A includes the plurality of coupler units 17A. The coupler units 17A are each provided with the wire coupler 18A, the electric power line coupler 192A, the signal line coupler 191A, and the grounding line coupler 193A. The interface 15 includes an electric power supply terminal 151, a grounding terminal 152, and a signal input terminal 153 as illustrated in FIG. 3. The drive unit DU further includes an electric power line PW1, a grounding line GW1, a signal line SW0, and a signal line SW1. The electric power line PW1 connects the electric power supply terminal 151 and the electric power line coupler 192A. The grounding line GW1 connects the grounding terminal 152 and the grounding line coupler 193A. The signal line SW0 connects the signal input terminal 153 and the motor controller MC. The signal line SW1 connects the motor controller MC and the signal line coupler 191A. The drive unit DU further includes an electric power line PW1A, an electric power line PW1B, a grounding line GW1A, and a grounding line GW1B. The electric power line PW1A is branched from the electric power line PW1 and coupled to the motor controller MC. The electric power line PW1B is branched from the electric power line PW1 and coupled to the drive motor DM. The grounding line GW1A is branched from the grounding line GW1 and coupled to the motor controller MC. The grounding line GW1B is branched from the grounding line GW1 and coupled to the drive motor DM. Further, the drive unit DU includes a drive shaft FW1. The drive shaft FW1 serves as a power transmitting member that connects the drive motor DM and the wire coupler 18A. The drive shaft FW1 may be structured by a material same as that of the flexible wire FW2, etc., or may be a metal shaft having rigidity. Further, the drive shaft FW1 may be made detachable from and attachable to the wire coupler 18A. Note that illustrations of the electric power lines PW1, PW1A, and PW1B and the grounding lines GW1, GW1A, and GW1B are omitted in FIG. 2B.

The housing 10 is further provided therein with CPU 12, an electric power supply 13, and a memory 14. The CPU 12 controls the entire figure system, for example. The memory 14 may contain programs and various pieces of data for controlling the entire figure system or for controlling a motion of the FIG. 2. The CPU 12 is provided with a terminal 12T. The terminal 12T is coupled to the signal input terminal 153, allowing a control signal to be sent to the motor controller MC through the signal line SW0. A control signal from the motor controller MC is transmitted to the encoders 55 of the respective movable mechanisms 5 through the signal line SW1, the multi-coupler pair 16, the signal lines SW3 and SW2, etc. The electric power supply terminal 151 is coupled to a terminal 13T provided on the electric power supply 13, allowing for a supply of electric power to the motor controller MC, the drive motors DM, and the encoders 55 through the electric power lines PW1, PW1A, and PW1B, the multi-coupler pair 16, the electric power lines PW3 and PW2, etc. In addition, the grounding terminal 152 is grounded.

2. Example of Detailed Configuration of Joints

A description is given next of details of a configuration of the joint. Each of the joints includes one or the plurality of movable mechanisms 5.

Example of Configuration of Neck Joint 31

For example, the neck joint 31 includes three movable mechanisms 5 (see FIG. 4C). Specifically, the neck joint 31 has three movable mechanisms 5, including a movable mechanism configured by a body 311 that pivots around an axis 31J1, a movable mechanism configured by a rotary member 312 that pivots around an axis 31J2, and a movable mechanism configured by a rotary member 313 that pivots around an axis 31J3. The axis 31J1 extends in a vertical direction relative to the upper torso 20A. The axis 31J2 extends in a right-left direction of the FIG. 2 relative to the body 311. The axis 31J3 extends in a front-rear direction of the FIG. 2 relative to the rotary member 312.

Providing the neck joint 31 that includes those movable mechanisms achieves a behavior as follows. For example, the body 311 pivots around the axis 31J1, whereby the head 21 rotates in the right-left direction (in a direction denoted by an arrow Y311) while the upper torso 20A of the FIG. 2 faces the front. Further, the rotary member 312 pivots around the axis 31J2, whereby the head 21 tilts in the front-rear direction (in a direction denoted by an arrow Y312). Furthermore, the rotary member 313 pivots around the axis 31J3, whereby the head 21 tilts in the right-left direction (in a direction denoted by an arrow Y313) while the upper torso 20A of the FIG. 2 faces the front.

Example of Configuration of Shoulder Joint 32L

Further, for example, the shoulder joint 32L includes two movable mechanisms (see FIG. 4C). Specifically, the shoulder joint 32L has two movable mechanisms, including a movable mechanism configured by a rotary member 321L that pivots around an axis 32J1 and a movable mechanism configured by a rotary member 322L that pivots around an axis 32J2. The axis 32J1 extends in the right-left direction relative to the upper torso 20A. The axis 32J2 extends in the front-back direction of the FIG. 2 relative to the rotary member 321L. Owing to the two movable mechanisms included in the shoulder joint 32L, for example, the rotary member 321L pivots around the axis 32J1, whereby the left arm 22L pivots around the axis 32J1 in the front-rear direction (in a direction denoted by an arrow Y321). Further, the rotary member 322L pivots around the axis 32J2, whereby the left arm 22L pivots in an up-down direction (in a direction denoted by an arrow Y322).

Note that a description is given here with reference to examples of the neck joint 31 and the shoulder joint 32L. It is to be also noted that any other joint is also provided with one or more movable mechanisms each including the output shaft 54.

Relationship Between Movable Mechanism 5 and Flexible Wire FW

A description is given next, with reference to FIG. 7, of a relationship between the movable mechanism 5 and the flexible wire FW by referring to examples of the elbow joint 34L and the hand joint 35L of the left arm 22L. FIG. 7 is a conceptual diagram describing how power is transmitted from the drive unit DU to the elbow joint 34L and the hand joint 35L.

Referring to FIG. 7, etc., the elbow joint 34L includes a fixed member 341L, the rotary member 342L, and the movable mechanism 5. The fixed member 341L is fixed to the upper arm 221L. The rotary member 342L is held rotatably with respect to the fixed member 341L. The movable mechanism 5 is interposed between the fixed member 341L and the rotary member 342L. The rotary member 342L is fixed to the output shaft 54 of the movable mechanism 5, and is held rotatably with respect to the fixed member 341L around the output shaft 54. The forearm 222L is fixed to the rotary member 342L. In addition, an end of the flexible wire FW2 (only a tube 6A is illustrated in FIG. 7) is coupled to the worm gear 51, allowing the rotative force derived from the drive motor DM to be transmitted to the worm gear 51. The flexible wire FW2 is disposed along the upper arm 221L, and inserted through the inside of the tube 6A. Further, ends of the respective signal line SW2, electric power line PW2, and grounding line GW2 (only a tube 7A is illustrated in FIG. 7) are coupled to the encoder 55. The signal line SW2, the electric power line PW2, and the grounding line GW2 are disposed along the upper arm 221L, and inserted through the inside of the tube 7A.

Similarly, the hand joint 35L includes a fixed member 351L, the rotary member 352L, and the movable mechanism 5. The fixed member 351L is fixed to the forearm 222L. The rotary member 352L is held rotatably with respect to the fixed member 351L. The movable mechanism 5 is interposed between the fixed member 351L and the rotary member 352L. The rotary member 352L is fixed to the output shaft 54 of the movable mechanism 5, and is held rotatably with respect to the fixed member 351L around the output shaft 54. The hand 223L is fixed to the rotary member 352L. In addition, an end of the flexible wire FW2 (only a tube 6B is illustrated in FIG. 7) is coupled to the worm gear 51, allowing the rotative force derived from the drive motor DM to be transmitted to the worm gear 51. The flexible wire FW2 is disposed along the forearm 222L, and inserted through the inside of the tube 6B. Further, ends of the respective signal line SW2, electric power line PW2, and grounding line GW2 (only a tube 7B is illustrated in FIG. 7) are coupled to the encoder 55. The signal line SW2, the electric power line PW2, and the grounding line GW2 are disposed along the forearm 222L, and inserted through the inside of the tube 7B. Here, the tube 6B and the tube 7B each may be so provided as to extend through any other movable body that is positioned between the drive unit DU and the hand joint 35L, i.e., through the vicinity of a central part (for example, the output shaft 54) of the movable mechanism 5 of the elbow joint 34L. One reason is to avoid a situation, such as application of unnecessary tension to the flexible wires FW2 that pass through the tube 6B and the tube 7B, etc., resulting from, for example, a rotation of the rotary member 342L of the elbow joint 34L which interferes with the tube 6B and the tube 7B when the rotary member 342L is rotated.

Note that the elbow joint 34L and the hand joint 35L are exemplified here. It is to be noted, however, that a similar configuration is applicable to a relationship between the movable mechanism 5 of any other joint and the flexible wire FW2 as well.

3. Basic Operation of Figure

The figure system according to the present embodiment performs the motion control of the FIG. 2 on the basis of instructions given from the CPU 12. Specifically, signals are transmitted to the drive motors DM that correspond to the respective joints, in accordance with predetermined programs stored in the memory 14. This activates the drive motors DM (to turn the power on), whereby an operation of rotating the movable mechanisms of the respective joints is carried out to move the limbs and the body freely. Here, it is desirable that torque required for moving any drive motor DM upon power-off be larger than torque derived from a weight applied to the joint corresponding to that drive motor DM. One reason is that this makes it possible to retain a posture of the FIG. 2 when the power is turned off.

Further, the CPU 12 may turn the power of only some of the drive motors DM on and turn the power of the remaining drive motors DM off, instead of turning the power of all of the drive motors DM on. For example, upon moving only some of the movable mechanisms out of the plurality of movable mechanisms, the CPU 12 may turn the power of some of the drive motors DM corresponding to the some of the movable mechanisms on for a predetermined time period, and may turn the power of the other drive motors DM off for a predetermined time period. One reason is that, even when the power of each of the drive motors DM corresponding to the respective movable mechanisms on which no operation is to be performed is turned off, this makes it possible to retain a posture of the FIG. 2 by taking advantage of the torque required for moving those drive motors DM as described above.

4. Operation of Joint

A description is given here, with reference to FIG. 7, etc., of an operation of the forearm 222L and the hand 223L by referring to examples of the elbow joint 34L and the hand joint 35L. The forearm 222L operates by rotation of the rotary member 342L of the elbow joint 34L. In other words, transmitting, through the drive shaft FW1 and the flexible wires FW2 and FW3, the rotative force derived from the drive motor DM to the rotary member 342L that is coupled to the output shaft 54 of the movable mechanism 5 allows for movement of the forearm 222L. Specifically, the corresponding drive motor DM is driven on the basis of the signal supplied from the CPU 12 to rotate its drive shaft FW1 in a predetermined direction, whereby the wire coupler pair 18, the flexible wire FW3, the wire coupler pair 27, and the flexible wire FW2 are also rotated in the same direction. Thus, the corresponding worm gear 51 is rotated, for example, in the +R51 direction, causing the reduction gear 52 engaged with that worm gear 51 to be rotated in the +R52 direction and causing the reduction gear 53 engaged with the reduction gear 52 to be rotated in the +R53 direction. This rotates the rotary member 342L in a direction denoted by an arrow +R342L around the output shaft 54 (rotates the rotary member 342L counterclockwise on the FIG. 7 plane). As a result, the forearm 222L fixed to the rotary member 342L pivots, around the elbow joint 34L as a point of support, in a direction in which the forearm 222L becomes close to parallel to the upper arm 221L (in a direction of straightening the elbow). Conversely, rotating the corresponding worm gear 51 in the −R51 direction causes the rotary member 342L to rotate in a direction denoted by an arrow −R342L around the output shaft 54 (rotates the rotary member 342L clockwise on the FIG. 7 plane). As a result, the forearm 222L fixed to the rotary member 342L pivots, around the elbow joint 34L as the point of support, in a direction in which the forearm 222L moves close to the upper arm 221L (in a direction of bending the elbow). Note that the hand joint 35L and the hand 223L, positioned more toward the tip than the elbow joint 34L and the forearm 222L, are hardly influenced by the movement of the elbow joint 34L and the forearm 222L. One reason is that the tube 6B that contains the flexible wire FW2 and the tube 7B that contains the signal line SW2, etc., are so provided as to extend through the central part of the rotary member 342L.

The above applies similarly to the hand joint 35L as well. In other words, transmitting, through the drive shaft FW1 and the flexible wires FW2 and FW3, the rotative force derived from the drive motor DM to the rotary member 352L that is coupled to the output shaft 54 of the movable mechanism 5 allows for movement of the hand 223L.

5. Workings and Effects

The figure system according to the present embodiment includes the drive motors DM that drive the FIG. 2. The drive motors DM are provided in the drive units DU contained in the base 1. This eliminates the necessity of providing a drive source on the FIG. 2 itself, making it suitable for achieving a reduction in size and weight saving of the FIG. 2. This also achieves the FIG. 2 having superior aesthetic appearance, such as the FIG. 2 having a slim body shape. Further, the weight saving of the FIG. 2 makes it possible to keep low an output of the drive motor DM required for driving. Achieving the weight saving of the FIG. 2 is also advantageous in terms of lower costs and elimination of risks upon a fall, even in a case where the FIG. 2 is increased in size. Further, the rotative force derived from the drive motor DM of the drive unit DU is transmitted to any of the respective joints through the flexible wire FW for the driving of the FIG. 2. This stabilizes the motion of the FIG. 2 and achieves high reproducibility of the motion accordingly. In addition thereto, the encoder 55 detects the amount of operation (the angle of rotation) of the output shaft 54 of the movable mechanism 5. This achieves stabilization and high accuracy of the motion of the FIG. 2, allowing for expectations on a higher motion reproducibility. Further, adopting the flexible wire FW having flexibility makes it possible to achieve a high degree of freedom for the motion of the FIG. 2, and to reproduce a wide variety of motions accordingly.

In addition, the present embodiment is structured to achieve the coupling between the base 1 and the intermediate part 3 as well as the coupling between the intermediate part 3 and the FIG. 2 by means of the multi-couplers 16A and 16B and the multi-couplers 25A and 25B, allowing for superior handling easiness.

2. Modification Examples

Although the invention has been described in the foregoing with reference to some embodiments and some modification examples, the invention is not limited to the foregoing embodiments, etc., but may be modified in a wide variety of ways. For example, any other simplified actuator, such as a polymer actuator or a solenoid actuator, may also be used as the drive source. Further, a servomotor may be used to drive directly any joint that requires greater drive force. In any case, a combination of different kinds of actuators may be used depending on application and usage.

Further, the foregoing embodiment provides the intermediate part 3 between the base 1 and the FIG. 2. The base 1 and the FIG. 2, however, may be coupled directly to each other. In such a case, for example, the multi-coupler 16A and the multi-coupler 25B may be joined to form a multi-coupler pair in an example of FIG. 2.

Further, for example, the invention may be so configured as to allow a plurality of component parts to be joined detachably and attachably inside the FIG. 2 as well by means of the multi-coupler. In such a case, as in a first modification example illustrated by way of example in FIG. 8, respective connections between the plurality of bone members and the plurality of joints that connect them with each other may be provided with their respective multi-coupler pairs 291 to 293. The upper arm 221L, the forearm 222L, and the hand 223L may serve as such a plurality of bone members, and the elbow joint 34L and the hand joint 35L may serve as such a plurality of joints. Here, the flexible wire FW2 is divided into: a part FW2A1 and a part FW2B1 that respectively pass through tubes 6A1 and 6B1 that are along the upper arm 221L; a part FW2A2 and FW2B2 that respectively pass through tubes 6A2 and 6B2 that are provided at the elbow joint 34L; a part FW2B3 that passes through a tube 6B3 that is along the forearm 222L; and a part FW2B4 that passes through a tube 6B4 that is provided at the hand joint 35L. The signal line SW2 is also divided into: a part SW2A1 and a part SW2B1 that respectively pass through tubes 7A1 and 7B1 that are along the upper arm 221L; a part SW2A2 and SW2B2 that respectively pass through tubes 7A2 and 7B2 that are provided at the elbow joint 34L; a part SW2B3 that passes through a tube 7B3 that is along the forearm 222L; and a part SW2B4 that passes through a tube 7B4 that is provided at the hand joint 35L. The electric power line PW2 and the grounding line GW2 are divided in a similar manner to the signal line SW2 as well. The parts FW2A1 and FW2B1 and the parts FW2A2 and FW2B2 are respectively coupled to each other at the multi-coupler pair 291 comprising a first part coupler 291A provided at the end 2T2 of the first part and a second paret coupler 291B provided at the end 2T2 of the second part, and the parts SW2A1 and SW2B1 and the parts SW2A2 and SW2B2 are respectively coupled to each other at the multi-coupler pair 291. The part FW2B2 and the part FW2B3 are coupled to each other at the multi-coupler pair 292, and the part SW2B2 and the part SW2B3 are coupled to each other at the multi-coupler pair 292. Further, the part FW2B3 and the part FW2B4 are coupled to each other at the multi-coupler pair 293, and the part SW2B3 and the part SW2B4 are coupled to each other at the multi-coupler pair 293. The electric power line PW2 and the grounding line GW2 are coupled in a similar manner to the signal line SW2 as well. Configuring the bone members and the joints to be detachable and attachable at the multi-coupler pairs 291 to 293 together with the flexible wire FW2, the signal line SW2, the electric power line PW2, and the grounding line GW2 in this way is preferable in that handling properties upon manufacturing, repair, replacement, etc., improve.

Further, the description has been given of the foregoing embodiment in which the tube 6 that contains the flexible wire FW and the tube 7 that contains the signal line SW, etc., are provided separately. The invention, however, is not limited thereto. As in a second modification example illustrated by way of example in FIG. 9, the FIG. 2 may have a plurality of tubes 8 each including a first hollow passage 8A and a second hollow passage 8B. In such a case, for example, the plurality of flexible wires FW2 may be so provided as to be contained and extend in the first hollow passage 8A for each of the corresponding movable mechanisms 5 out of the plurality of movable mechanisms 5, whereas the plurality of signal lines SW2, the plurality of electric power lines PW2, and the plurality of grounding lines GW2 may be so provided as to be contained and extend in the second hollow passage 8B for each of the corresponding movable mechanisms 5.

Further, in the foregoing embodiment, etc., the flexible wires FW, etc., are introduced into the FIG. 2 from the back of the torso 20. However, the wires may be introduced into the FIG. 2 from any other part of the figure (such as the sole of a foot).

Further, the base 1, the intermediate part 3, and the FIG. 2 are configured to be detachable and attachable in an embodiment. However, a structure may be employed in which the base 1 and the intermediate part 3 are non-separable, or in which the intermediate part 3 and the FIG. 2 are non-separable.

Further, as in a FIG. 2A illustrated by way of example in FIG. 10, the invention may have combined modules MD each including one or a plurality of movable mechanisms. FIG. 10 schematically illustrates an overall configuration of the FIG. 2A according to a third modification example of the invention.

Specifically, the FIG. 2A includes a torso module MD1, a head module MD2, a right arm module MD3, a left arm module MD4, a right leg module MD5, and a left leg module MD6, for example. The torso module MD1, the head module MD2, the right arm module MD3, the left arm module MD4, the right leg module MD5, and the left leg module MD6 each include the bone member and the movable mechanism.

Further, the torso module MD1 is provided with multi-couplers 4B1, 4C1, 4D1, 4E1, and 4F1. The head module MD2 is provided with a multi-coupler 4B2. The multi-coupler 4B2 is made detachable from and attachable to the multi-coupler 4B1 of the torso module MD1. The multi-coupler 4B2 is joined to the multi-coupler 4B1 to configure a multi-coupler pair 4B, thus allowing the head module MD2 and the torso module MD1 to be joined to each other. The right arm module MD3 is provided with a multi-coupler 4C2. The multi-coupler 4C2 is made detachable from and attachable to the multi-coupler 4C1 of the torso module MD1. The multi-coupler 4C2 is joined to the multi-coupler 4C1 to configure a multi-coupler pair 4C, thus allowing the right arm module MD3 and the torso module MD1 to be joined to each other. The left arm module MD4 is provided with a multi-coupler 4D2. The multi-coupler 4D2 is made detachable from and attachable to the multi-coupler 4D1 of the torso module MD1. The multi-coupler 4D2 is joined to the multi-coupler 4D1 to configure a multi-coupler pair 4D, thus allowing the left arm module MD4 and the torso module MD1 to be joined to each other. The right leg module MD5 is provided with a multi-coupler 4E2. The multi-coupler 4E2 is made detachable from and attachable to the multi-coupler 4E1 of the torso module MD1. The multi-coupler 4E2 is joined to the multi-coupler 4E1 to configure a multi-coupler pair 4E, thus allowing the right leg module MD5 and the torso module MD1 to be joined to each other. The left leg module MD6 is provided with a multi-coupler 4F2. The multi-coupler 4F2 is made detachable from and attachable to the multi-coupler 4F1 of the torso module MD1. The multi-coupler 4F2 is joined to the multi-coupler 4F1 to configure a multi-coupler pair 4F, thus allowing the left leg module MD6 and the torso module MD1 to be joined to each other.

The FIG. 2A thus can be a combined body having the plurality of modules, making it possible to manufacture each of the modules individually and to assemble those modules finally to thereby complete the FIG. 2A. Hence, it is possible to achieve improvement in productivity. Further, the FIG. 2A allows for replacement on a module basis, making it possible to perform repair, etc., easily and quickly and allow for a promising improvement in maintainability as well.

Further, the plurality of signal lines and the plurality of electric power lines each may be shared by some devices. Further, the signal line may be used as the electric power line and vice versa.

Further, the joints exemplified in the foregoing embodiment, etc., are illustrative and thus the technology is not limited to a case where the foregoing joints are all provided. In addition, any other joint may be provided. Further, the figure is not limited to a doll. For example, the figure may represent, as its motif, an animal in nature such as a dog. The figure may also represent, as its motif, an imaginary character or a fantasy-based character. Moreover, the figure may have an overall size that is reduced to, for example, about 15 cm to about 30 cm, or may be a life-size figure.

Moreover, according to the technology, the base and/or the figure may be provided with various devices such as a display, an acoustic device including a speaker, or a projector. Specifically, the figure may have an input device such as an imaging device, a microphone, or a touch sensor. The figure may further have an output device such as a speaker, an illuminator (such as a light-emitting diode), a vibration device, or a display device (LCD: liquid crystal display). The input device and the output device are coupled to the CPU 12, the electric power supply 13, and the GND through the signal line SW, the electric power line PW, the grounding line GW, etc. Providing the input device and the output device in the figure system allows for loading of image information, sound information, or touch information into the CPU 12 through the figure, whereas providing the output device allows the figure to perform conversation and a motion both corresponding to the acquired image information and the acquired sound information.

Further, the technology may include a clutch mechanism provided, for example, between the reduction gear 53 and the output shaft 54. One reason is that the clutch mechanism operates in a case where, for example, great force is applied to any joint from the outside (human body), thus making it possible to disconnect the output shaft 54 from the force derived from the drive unit DU. As a result, it is possible to prevent the human body or the FIG. 2 itself from being affected by the strong force.

Further, in the foregoing embodiment, etc., the flexible wires FW2 are so inserted as to extend from the drive unit DU to the respective movable mechanisms 5. The technology, however, is not limited thereto. Specifically, a portion, in a longitudinal direction, of one or more flexible wires out of the plurality of flexible wires may be replaced by one or more bar members. The one or more bar members each have stiffness higher than stiffness of the one or more flexible wires. In such a case, the bar members may be disposed along the plurality of bone members. For example, a fourth modification example illustrated in FIG. 11 describes a state in which bar members 9A1, 9B1, and 9B3 (hereinafter may sometimes be collectively referred to as a bar member 9) are disposed along the upper arm 221L that serves as the bone member. FIG. 11 is a conceptual diagram describing a structure near the joints of the figure according to the fourth modification example of the invention. FIG. 11 illustrates the bar members 9A1 and 9B1 that are disposed along the upper arm 221L serving as the bone member, and the bar member 9B3 that is disposed along the forearm 222L serving as the bone member. The bar members 9A1, 9B1, and 9B3 respectively replace the parts FW2A1, FW2B1, and FW2B3 of the flexible wires FW2 illustrated in FIG. 8. Note that one end of each of the bar members 9A1 and 9B1 is coupled to a multi-coupler pair 290, and the other end of each of the bar members 9A1 and 9B1 is coupled to the multi-coupler pair 291. In other words, the bar members 9A1 and 9B1 are respectively coupled to a part FW2A0 and a part FW2B0 of the flexible wires FW2 through the multi-coupler pair 290, and are respectively coupled to the part FW2A2 and the part FW2B2 of the flexible wires FW2 through the multi-coupler pair 291. Further, the bar member 9B3 is coupled to the part FW2B2 of the flexible wire FW2 through the multi-coupler pair 292, and is coupled to the part FW2B4 of the flexible wire FW2 through the multi-coupler pair 293. Note that the parts SW2A1 and SW2B1 of the signal line SW2 are respectively coupled to parts SW2A0 and SW2B0 of the signal line SW2 through the multi-coupler pair 290.

The bar member 9 is a shaft having aluminum or carbon as a main ingredient, for example. For example, the bar member 9 has a diameter from about 5 mm to about 10 mm. The bar member 9 has the higher stiffness than the flexible wire FW2, and is hence smaller in amount of displacement, such as twisting or bending, than the flexible wire FW2. Replacing a part of the flexible wire FW2 by the bar member 9 thus makes it possible to transmit the rotative force of the drive motor DM to the movable mechanisms 5 faster and more efficiently than a case where the part of the flexible wire FW2 is not replaced by the bar member 9. Accordingly, the figure according to the fourth modification example is advantageous in terms of reproduction of a wider variety of motions, owing to use of the flexible wire FW2 only for any part that involves bending and owing to use of the highly-rigid bar member 9 for any part that does not bend, such as for a part that follows along any bone member. For example, the figure according to the fourth modification example makes it possible to perform a faster motion without any delay. Further, use of the bar member 9, having the higher stiffness and easier in handling than the flexible wire FW2 having the flexibility, improves the handling properties upon manufacturing, repair, replacement, etc. In addition thereto, the use of the bar member 9 allows for a promising cost reduction, owing to application of a general-purpose product to the bar member 9.

Further, in the foregoing embodiment, the plurality of movable mechanisms 5 each include the reduction gears 52 and 53 to thereby cause, in each of the movable mechanisms 5, the rotary member to rotate at a predetermined reduction ratio with respect to the number of rotations of the worm gear 51. The invention, however, is not limited thereto. According to the technology, the movable mechanism 5 may have a reduction mechanism 90 illustrated by way of example in FIGS. 12A to 12C instead of the reduction gears 52 and 53. FIGS. 12A to 12C each illustrate a configuration of the reduction mechanism 90 provided at the joint of the figure according to a fifth modification example of the invention. More specifically, FIG. 12A is a perspective view of an appearance of the reduction mechanism 90, FIG. 12B is a perspective view of an internal structure of the reduction mechanism 90 with a later-described outer gear 97 and a later-described rotary plate 951 being removed, and FIG. 12C is a front view of the reduction mechanism 90 with the outer gear 97 being removed and as viewed from the front.

The reduction mechanism 90 illustrated in FIGS. 12A to 12C has a plurality of planetary gear mechanisms 91 to 93 that are coupled in series in an extending direction of a rotary shaft J90. The reduction mechanism 90 further includes an input gear mechanism 94 and an output rotary mechanism 95. The input gear mechanism 94 includes an input shaft 941 and input gears 942 and 943. The output rotary mechanism 95 includes the rotary plate 951 and a rotary plate 952. The planetary gear mechanisms 91 to 93 are interposed between the input gear mechanism 94 and the output rotary mechanism 95. The planetary gear mechanism 91, the planetary gear mechanism 92, and the planetary gear mechanism 93 are disposed in order from the input gear mechanism 94 to the output rotary mechanism 95.

The planetary gear mechanisms 91 to 93 each include a sun gear 96, the outer gear 97, and a plurality of planetary gears 98. The sun gear 96 is provided on the rotary shaft J90. The outer gear 97 is provided with teeth on an inner surface that faces the sun gear 96. The plurality of planetary gears 98 are provided between the sun gear 96 and the outer gear 97, and are each in engagement with both of the sun gear 96 and the outer gear 97. The sun gear 96 of the planetary gear mechanism 91 rotates together with the input gear 943. The sun gear 96 of the output-side planetary gear mechanism 93 causes the rotary plates 951 and 952 of the output rotary mechanism 95 around the rotary shaft J90. The rotary plates 951 and 952 serve as the rotary member of the movable mechanism 5.

It is desirable that, in the reduction mechanism 90, outer diameters of the planetary gear mechanisms 91 and 93 that are positioned on both ends along the rotary shaft J90 be equal to or less than an outer diameter of the planetary gear mechanism 92 interposed between the planetary gear mechanisms 91 and 93. In general, in a reduction mechanism, rotative torque increases as going toward the output side from the input side. Accordingly, the planetary gear mechanism 93 positioned closest to the output side is required to transmit the largest rotative torque. Hence, under ordinary circumstances, it is desirable that the outer diameter of the planetary gear mechanism 93 be made larger than the outer diameter of each of the planetary gear mechanisms 91 and 92. However, making the sun gear 96, the outer gear 97, and the plurality of planetary gears 98 of the planetary gear mechanism 93 with a metal and making their sizes along the rotary shaft J90 larger make it possible to suppress an increase in the outer diameter of the planetary gear mechanism 93.

The planetary gear mechanisms 91 to 93 thus have the common rotary shaft J90 and are coupled in series along the rotary shaft J90 in the reduction mechanism 90, which is suitable for making small a size of the reduction mechanism 90 as a whole. Accordingly, it is possible to obtain a larger reduction ratio and transmit larger torque while making a size of the movable mechanism 5 smaller, as compared with a case where the reduction gears 52 and 53 as spur gears are used as illustrated by way of example in FIG. 5. Hence, use of the reduction mechanism 90 in a case where the joint is covered with the substantially-spherical cover makes it possible to avoid an increase in a diameter of the substantially-spherical cover. The substantially-spherical cover has the outer surface that includes the spherical surface. In particular, it is possible to make the diameter of the substantially-spherical cover smaller by suppressing the outer diameters of the planetary gear mechanisms 91 and 93, positioned on the both ends along the rotary shaft J90, to be equal to or less than the outer diameter of the planetary gear mechanism 92 interposed between the planetary gear mechanisms 91 and 93.

Further, in the foregoing embodiment, etc., the coupling between the flexible wires that transmit the rotative force, the coupling between the signal lines, the coupling between the electric power lines, and the coupling between the grounding lines are all made at a coupler part such as the multi-coupler. The technology, however, is not limited thereto. For example, coupling other than that between the flexible wires, i.e., the coupling between the signal lines, the coupling between the electric power lines, the coupling between the grounding lines, etc., each may be performed through a separately-provided connector. This achieves a compact coupler part and a simplified structure, allowing for a promising improvement in the handling properties upon manufacturing, repair, replacement, etc.

Further, in the foregoing embodiment, etc., the figure is provided with the reduction mechanism. In the technology, however, the reduction mechanism may be provided on the drive unit side, depending on a type of an actuator which is based on a site at which the movable body is provided. For example, it is possible to achieve a wider variety of motions by using a DC motor for a site that is actuated by comparatively-low torque, such as a hand or a finger. The DC motor is comparatively low in output torque but operates at the high number of rotations. However, the low output torque of the actuator sometimes raises an issue in terms of a loss of rotative force (rotative torque) upon transmitting the rotative force (rotative torque) to the movable mechanism through the flexible wires, etc. To address this, the reduction mechanism is provided near the actuator to increase the rotative torque to some extent in advance and thereby to transmit the rotative force (the rotative torque) to the movable mechanism through the flexible wires, etc., making it possible to suppress the loss. Note that use of the actuator that operates at the high number of rotations, such as the DC motor, allows for an increase in reduction ratio as compared with a case where an actuator is used that is high in output torque and low in number of rotations, such as a stepping motor. Thus, even in a case where any joint has received torque from the outside, an operation of that joint is less influenced by the torque derived from the outside.

Further, the foregoing embodiment, etc., have been described by referring to, as an example, the figure and the figure system that have the movable mechanism and the flexible wire. The disclosure, however, is not limited thereto. The disclosure also encompasses, in concept, a power mechanism having the movable mechanism and the flexible wire, such as a robot arm or a robot. The power mechanism according to the disclosure includes, for example, an actuator that generates rotative force, a movable body that operates by the rotative force, an operation amount detector that detects an amount of operation of the movable body, and a flexible wire that connects the actuator and the movable body and transmits the rotative force generated by the actuator to the movable body. Alternatively, the power mechanism according to the disclosure includes a plurality of modules that are combined with respect to each other, and a detachment configured to be coupled to a drive unit that includes a plurality of actuators. The plurality of actuators each generate rotative force. The plurality of modules each include a movable body that operates by the rotative force generated by one of the plurality of actuators, an operation amount detector that detects an amount of operation of the movable body, and a flexible wire that connects the one of the actuators and the movable body, and transmits the rotative force generated by the one of the actuators to the movable body. The power mechanism according to the disclosure may further include, as with the figure described in the foregoing embodiment, etc., a plurality of bone members, and a plurality of joints each including the plurality of movable bodies and each connecting the bone members together. The power mechanism according to the disclosure having such a configuration is higher in degree of design freedom than traditional robots, etc., and makes it possible to achieve a wide variety of motions. For example, the power mechanism according to the disclosure having such a configuration allows for an easier change in length, etc., of an arm. Further, the foregoing embodiment, etc., have been described by giving the encoder as an example of the operation amount detector. The disclosure, however, is not limited thereto. For example, a potentiometer may be used in the disclosure as the operation amount detector.

Note that effects described herein are illustrative only. Effects are not limited to those described herein, and effects other than those described herein may be exerted as well. It should be understood by those skilled in the art that various modifications, combinations, sub-combinations and alterations may occur depending on design requirements and other factors insofar as they are within the scope of the appended claims or the equivalents thereof.

A figure system and a power mechanism according to the disclosure may have the following industrial applicability.

For example, the figure system and the power mechanism according to the disclosure may be installed in an amusement machine such as a pachinko pinball machine or a stationary game console to allow for a large variety of motions performed in conjunction with the amusement machine. The figure system according to the disclosure achieves a reduction in size and weight, and is thus suitable for the above applications. Further, the figure system according to the disclosure may be disposed in a vehicle interior of an automobile, such as on a dashboard. In this case, an operation performed in conjunction with, e.g., a car navigation system, such as a route guidance or communication of information, may be performed. The wording "operation performed in conjunction with" as used herein may refer, for example, to performing of an output of the figure (such as performing a mechanical motion, outputting sound, or outputting light) on the basis of a signal derived from software of the car navigation system. Alternatively, any signal may be transmitted from the figure to the car navigation system to perform a control of the car navigation system.

The figure system and the power mechanism according to the disclosure make it possible to dispose electrical system parts collectively at the base, and thereby achieve a waterproof structure relatively easily. Hence, the figure system and the power mechanism are suitable for applications that involve outdoor installation.

The figure system and the power mechanism according to the disclosure dispose the heavy drive units collectively at the base, making it possible to achieve weight saving of the figure. Thus, the figure system and the power mechanism are superior in safety and allow for installation in the presence of a crowd of people as well. Hence, for example, the figure system and the power mechanism are suitable as a guide around a crowded shop, in a museum, etc.

The figure system and the power mechanism according to the disclosure have applicability to: a watch-over system directed to an elderly person, a pet, etc., in an ordinary household; and a monitoring system for an empty home. The figure system and the power mechanism according to the disclosure may be equipped with a communication function to allow for, for example, two-way communication with the outside and a control performed from the outside. For example, an alarm may be outputted to the outside in the event of abnormality. Alternatively, image data may be acquired periodically to transmit the data to the outside in the event of the abnormality. Moreover, a two-way conversation may be performed.

The figure system and the power mechanism according to the disclosure also allow for support of a learner, in conjunction with an educational application installed on a personal computer, a server on a network, etc. To give an example of possible use, the figure system and the power mechanism may operate while giving commentary on study contents, within a range of information prepared in advance or on the basis of information acquired by communication with the outside. Another example of possible use may be to perform coaching, such as determining whether a leaner's answer is correct or wrong and indicating a part with wrong answer, within the range of information prepared in advance or on the basis of information acquired by communication with the outside.

The figure system and the power mechanism according to the disclosure have applicability as a device that gives commentary related to broadcast contents in conjunction with a television broadcast or a radio broadcast, or performs communication of information related to the broadcast contents in conjunction with the television broadcast or the radio broadcast. In this case, the figure system and the power mechanism may, for example, give commentary on broadcast data by voice while causing arms and legs to perform any motion. Further, the figure system and the power mechanism according to the disclosure have applicability as a device that performs communication of information through Internet connection in conjunction with an information terminal such as a personal computer. The figure system and the power mechanism according to the disclosure are small and light, and allow the drivers to be disposed collectively at one place. Hence, the figure system and the power mechanism may be hooked up to the information terminal as a decorative accessory such as a strap.

The figure system and the power mechanism according to the disclosure have applicability as a toy that dances in conjunction with music production software. For example, the figure system and the power mechanism according to the disclosure may be operated on the basis of program instructions of music software. Alternatively, the figure system and the power mechanism may also be utilized as a device that captures a human motion in conjunction with a capture device and reproduces the same motion (i.e., mimics a motion). Further, the figure system and the power mechanism may also be utilized as a device that performs a motion in conjunction with a game console or game software. Performing a motion same as or corresponding to a motion of a character on a two-dimensional screen makes it possible to increase a realistic sensation of a game player. Possible examples may include causing the figure system to perform a motion of an opponent's character in conjunction with display performed on the two-dimensional screen and causing the figure system to perform a motion of a user's character not displayed on the two-dimensional screen, in a match-up game such as a fighting game and a sports game.

This application is based upon and claims priority from Japanese Patent Application No. 2016-228037 filed with the Japan Patent Office on Nov. 24, 2016, the entire contents of which are hereby incorporated by reference.

The invention claimed is:

1. A figure system comprising:
a plurality of drive units each including an actuator that generates rotative force;
a figure including a plurality of movable mechanisms and a plurality of rotative force transmitting members, the movable mechanisms each including a movable body that operates by the rotative force, the rotative force transmitting members including their respective first ends that are coupled to the movable bodies; and
an operation amount detector that detects an amount of operation of the movable body, the rotative force generated by one of the actuators being transmitted to a corresponding one of the movable bodies through one of the rotative force transmitting members,
wherein one or more rotative force transmitting members of the plurality of rotative force transmitting members comprises a flexible wire, and
a portion, in a longitudinal direction, of the flexible wire is replaced by a bar member, the bar member having stiffness higher than stiffness of the flexible wire.

2. A figure system comprising:
a plurality of drive units each including an actuator that generates rotative force;
a figure including a plurality of movable mechanisms and a plurality of rotative force transmitting members, the movable mechanisms each including a movable body that operates by the rotative force, the rotative force transmitting members including their respective first ends that are coupled to the movable bodies; and
an operation amount detector that detects an amount of operation of the movable body, the rotative force generated by one of the actuators being transmitted to a corresponding one of the movable bodies through one of the rotative force transmitting members,
wherein the figure further includes a plurality of bone members and a plurality of joints, the joints each including the movable bodies and each connecting the bone members together,
the rotative force transmitting members each include a first part and a second part, the first part being disposed along the bone member or inserted into the bone member, the second part being disposed along the joint or inserted into the joint,
the bone member includes a first part coupler provided at an end of the first part,
the joint includes a second part coupler provided at an end of the second part, the second part coupler being joined detachably and attachably to the first part coupler, or configured to be joined detachably and attachably to the first part coupler, and
detachment and coupling of the first part and the second part are performed by detachment and attachment of the first part coupler and the second part coupler.

3. The figure system according to claim 2, wherein
the drive unit further includes a first coupler unit having a plurality of first couplers, the first couplers respectively rotating by the rotative force derived from the actuators,
the figure further includes a second coupler unit having a plurality of second couplers, the second couplers being respectively coupled to second ends of the respective rotative force transmitting members, and being respectively configured to be rotatable, and
the first couplers are each joined detachably and attachably to corresponding one of the second couplers, or each configured to be joined detachably and attachably to the corresponding one of the second couplers.

4. The figure system according to claim 2, wherein directions of rotation axes of the respective first couplers and directions of rotation axes of the respective second couplers all substantially coincide with one another.

5. The figure system according to claim 2, further comprising a plurality of signal lines, wherein
the drive units each further include a controller that controls, on a basis of information derived from the operation amount detector, the actuator to thereby execute an operation of the movable mechanism,
the signals lines respectively connect the operation amount detectors and the controllers,
the first coupler unit includes a plurality of first signal line couplers,
the second coupler unit includes a plurality of second signal line couplers,
the signal lines each include a first section signal line part and a second section signal line part, the first section signal line part connecting the controller and corresponding one of the first signal line couplers, the second section signal line part connecting the operation amount detector and corresponding one of the second signal line couplers, and
the first signal line couplers are each joined detachably and attachably to corresponding one of the second signal line couplers, or each configured to be joined detachably and attachably to the corresponding one of the second signal line couplers.

6. The figure system according to claim 2, further comprising a plurality of electric power lines respectively coupled to the operation amount detectors, wherein
the drive units each further include a controller that controls, on a basis of information derived from the operation amount detector, the actuator to thereby execute an operation of the movable mechanism, the first coupler unit includes a plurality of first electric power line couplers, the second coupler unit includes a plurality of second electric power line couplers, the electric power lines each include a first section electric power line part and a second section electric power line part, the first section electric power line part connecting the controller and corresponding one of the first electric power line couplers, the second section electric power line part connecting the operation amount detector and a corresponding one of the second electric power line couplers, and the first electric power line couplers are each joined detachably and attachably to a corresponding one of the second electric power line couplers, or each configured to be joined detachably and attachably to the corresponding one of the second electric power line couplers.

7. The figure system according to claim 2, wherein the figure includes a plurality of first tubes, and the rotative force transmitting members are contained in and extend through any of the first tubes, for corresponding each of the movable mechanisms.

8. The figure system according to claim 2, wherein the drive units each further include a controller that controls, on a basis of information derived from the operation amount detector, the actuator to thereby execute an operation of the movable mechanism.

9. The figure system according to claim 8, further comprising:
a plurality of signal lines that respectively connect the operation amount detectors and the controllers; and
a plurality of electric power lines respectively coupled to the operation amount detectors.

10. The figure system according to claim 2, wherein the figure further includes a plurality of bone members and a plurality of joints, the joints each including the movable bodies and each connecting the bone members together, and
the joints each include a rotary member that rotates around a rotary shaft and has a cross section, the cross section being orthogonal to the rotary shaft and at least a part of the cross section being in a shape of an arc.

11. The figure system according to claim 10, wherein the joints each include one of the movable mechanisms, and
the one of the movable mechanisms includes a reduction mechanism having one or more gear mechanisms.

12. The figure system according to claim 2, wherein positioned between the drive unit and one of the movable bodies that corresponds to one of the rotative force transmitting members is another one of the movable bodies, and
the one of the rotative force transmitting members extends through a central part of the other one of the movable bodies.

13. The figure system according to claim 2, wherein the figure further includes a plurality of bone members and a plurality of joints, the joints each including the movable bodies and each connecting the bone members together, and
the rotative force transmitting members are disposed along the bone members, or inserted into the bone members.

14. A figure system comprising:
a plurality of drive units each including an actuator that generates rotative force;
a figure including a plurality of movable mechanisms and a plurality of rotative force transmitting members, the movable mechanisms each including a movable body that operates by the rotative force, the rotative force transmitting members including their respective first ends that are coupled to the movable bodies; and
an operation amount detector that detects an amount of operation of the movable body, the rotative force generated by one of the actuators being transmitted to a corresponding one of the movable bodies through one of the rotative force transmitting members,
wherein the drive units each further include a first coupler unit having a first coupler, the first coupler rotating by the rotative force derived from the actuator,
the figure further includes a second coupler unit having a plurality of second couplers, the second couplers being respectively coupled to second ends of the respective rotative force transmitting members, and being respectively configured to be rotatable together with the rotative force transmitting members, and
the first couplers are each joined detachably and attachably to a corresponding one of the second couplers, or each configured to be joined detachably and attachably to the corresponding one of the second couplers.

15. The figure system according to claim 14, wherein the actuators each include a drive shaft, and
the drive shafts are respectively joined detachably and attachably to the first couplers, or respectively configured to be joined detachably and attachably to the first couplers.

16. A figure system comprising:
an intermediate part;
a plurality of drive units each including an actuator that generates rotative force;
a figure including a plurality of movable mechanisms and a plurality of rotative force transmitting members, the movable mechanisms each including a movable body that operates by the rotative force, the rotative force transmitting members including their respective first ends that are coupled to the movable bodies; and
an operation amount detector that detects an amount of operation of the movable body, the rotative force generated by one of the actuators being transmitted to corresponding one of the movable bodies through one of the rotative force transmitting members,
wherein the drive units each further include a first coupler unit having a first coupler, the first coupler rotating by the rotative force derived from the actuator,
the figure further includes a second coupler unit having a plurality of second couplers, the second couplers being respectively coupled to second ends of the respective rotative force transmitting members, and being respectively configured to be rotatable together with the rotative force transmitting members, and
the intermediate part includes:
a third coupler unit including a plurality of third couplers, the third couplers each being joined detachably and attachably to corresponding one of the first couplers or each being configured to be joined detachably and attachably to the corresponding one of the first couplers, and being respectively configured to be rotatable together with the first couplers;
a fourth coupler unit including a plurality of fourth couplers, the fourth couplers each being joined detachably and attachably to corresponding one of the second couplers or each being configured to be joined detachably and attachably to the corresponding one of the second couplers, and being respectively configured to be rotatable together with the second couplers; and the rotative force transmitting members respectively connecting the third couplers and the fourth couplers, and each transmitting the rotative force from the third coupler to the fourth coupler.

17. A figure system comprising:

a plurality of drive units each including an actuator that generates rotative force;

a figure including a plurality of modules that are combined with respect to each other, the modules each including a movable mechanism and a rotative force transmitting member, the movable mechanism including a movable body that operates by the rotative force, the rotative force transmitting member including an end coupled to the movable body; and an operation amount detector that detects an amount of operation of the movable body, the rotative force generated by one of the actuators being transmitted to a corresponding one of the movable bodies through one of the rotative force transmitting members, wherein the figure further includes a plurality of bone members and a plurality of joints, the joints each including the movable bodies and each connecting the bone members together, the rotative force transmitting members each include a first part and a second part, the first part being disposed along the bone member or inserted into the bone member, the second part being disposed along the joint or inserted into the joint, the bone member includes a first part coupler provided at an end of the first part, the joint includes a second part coupler provided at an end of the second part, the second part coupler being joined detachably and attachably to the first part coupler, or configured to be joined detachably and attachably to the first part coupler, and detachment and coupling of the first part and the second part are performed by detachment and attachment of the first part coupler and the second part coupler.

18. The figure system according to claim 17, wherein the movable mechanism includes the operation amount detector.

19. The figure system according to claim 17, wherein the drive units each further include a controller that controls, on a basis of information derived from the operation amount detector, the actuator to thereby execute an operation of the movable mechanism.

* * * * *